US011297541B2

(12) United States Patent
Joseph et al.

(10) Patent No.: US 11,297,541 B2
(45) Date of Patent: Apr. 5, 2022

(54) SIGNALING TIMING INFORMATION FOR A TIME SENSITIVE NETWORK IN A WIRELESS COMMUNICATIONS SYSTEM

(71) Applicant: QUALCOMM Incorporated, San Diego, CA (US)

(72) Inventors: Vinay Joseph, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 143 days.

(21) Appl. No.: 16/537,788

(22) Filed: Aug. 12, 2019

(65) Prior Publication Data
US 2020/0059829 A1 Feb. 20, 2020

Related U.S. Application Data

(60) Provisional application No. 62/719,580, filed on Aug. 17, 2018.

(51) Int. Cl.
*H04W 36/00* (2009.01)
*H04W 36/08* (2009.01)
*H04W 56/00* (2009.01)
*H04W 84/04* (2009.01)

(52) U.S. Cl.
CPC ........ *H04W 36/0011* (2013.01); *H04W 36/08* (2013.01); *H04W 56/001* (2013.01); *H04W 84/042* (2013.01)

(58) Field of Classification Search
CPC ............. H04W 28/0268; H04W 28/10; H04W 72/1205; H04W 72/1284; H04W 36/0011; H04W 36/08; H04W 56/001; H04W 84/042; H04L 47/24
See application file for complete search history.

(56) References Cited

U.S. PATENT DOCUMENTS

2018/0184438 A1  6/2018 Cavalcanti et al.
2018/0262924 A1* 9/2018 Dao .................. H04W 72/1257
(Continued)

FOREIGN PATENT DOCUMENTS

EP  3013004 A1  4/2016
WO  WO-2020035130 A1 * 2/2020 ........... H04L 67/322

OTHER PUBLICATIONS

"Ahmed Nasrallah, Akhilesh Thyagaturu, Ziyad Alharbi, Cuixiang Wang, Xing Shao, Martin Reisslein, and Hesham ElBakoury," Ultra-Low Latency (ULL) Networks: A Comprehensive Survey Covering the IEEE TSN Standard and related ULL Search, Mar. 20, 2018, IEEE, 59 pages (Year: 2018).*
(Continued)

*Primary Examiner* — Habte Mered
(74) *Attorney, Agent, or Firm* — Qualcomm Incorporated

(57) ABSTRACT

Methods, systems, and devices for wireless communications are described that provide for timing synchronization among one or more time sensitive network (TSN) endpoints via a wireless communications network. A data flow may be established via the wireless communications network, in which one or more system messages associated with the data flow may provide timing information for the data flow. A first node within the wireless communications network may receive a request for establishing such a data flow with a user equipment (UE). The first node may receive timing information for the data flow via one or more system messages associated with the data flow, and establish the data flow based at least in part on the timing information.

43 Claims, 15 Drawing Sheets

(56) References Cited

U.S. PATENT DOCUMENTS

| | | | | |
|---|---|---|---|---|
| 2019/0342800 | A1* | 11/2019 | Sirotkin | H04B 17/318 |
| 2020/0053678 | A1* | 2/2020 | Moon | H04W 88/023 |
| 2020/0322461 | A1* | 10/2020 | Gotz | H04L 69/162 |
| 2020/0351714 | A1* | 11/2020 | Su | H04W 28/0268 |
| 2020/0374741 | A1* | 11/2020 | Li | H04W 72/1257 |
| 2020/0374742 | A1* | 11/2020 | Chong | H04W 72/085 |
| 2020/0374743 | A1* | 11/2020 | Xin | H04L 29/08 |
| 2021/0007160 | A1* | 1/2021 | Sivasiva Ganesan | H04W 48/16 |
| 2021/0014765 | A1* | 1/2021 | Shan | H04W 8/02 |
| 2021/0168901 | A1* | 6/2021 | Kim | H04W 76/25 |
| 2021/0243640 | A1* | 8/2021 | Hoffmann | H04L 41/0816 |

OTHER PUBLICATIONS

Ericsson: "Anchor Change for Ethernet PDU Sessions", 3GPP TSG SA WG2 Meeting #128bis, 3GPP Draft; S2-187767—Ethernet-Anchor-Chang, 3rd Generation Partnership Project (3GPP), Mobile Competence Centre, 650, Route Des Lucioles ; F-06921 Sophia-Antipolis Cedex, France, vol. SA WG2, No. Sophia Antipolis, France; Aug. 20, 2018-Aug. 24, 2018, Aug. 14, 2018 (Aug. 14, 2018), 12 Pages, XP051536730, Retrieved from the Internet: URL: http://www.3gpp.org/ftp/tsg%5Fsa/WG2%5FArch/TSGS2%5F128BIS%5FSophia%5FAntipolis/Docs/S2%2D187767%2Ezip [retrieved on Aug. 14, 2018], Sections "Discussion", 6.x.1, 6.x.2.

Huawei et al., "QoS Negotiation between 3GPP and TSN Networks KI#3.1", SA WG2 Meeting #128bis, 3GPP Draft; S2-188233_TR23.734_Solution for KI 3_ QoS Negotiation between 3GPP and TSN Networks V1,3rd Generation Partnership Project (3GPP), Mobile Competence Centre, 650, Route Des Lucioles ; F-06921 Sophia-Antipolis Cedex, France, vol. SA WG2, No. Sophia Antipolis, France; Aug. 20, 2018-Aug. 24, 2018, Aug. 14, 2018 (2018-08-14), 8 Pages, XP051502940, Retrieved from the Internet: URL: http://www.3gpp.org/ftp/tsg%5Fsa/WG2%5FArch/TSGS2%5F128BIS%5FSophia%5FAntipolis/Docs/S2%2D188233%2Ezip [retrieved on Aug. 14, 2018], Sections 1., 2., 6.x.1,6.x.2.

International Search Report and Written Opinion—PCT/US2019/046284—ISA/EPO—dated Oct. 30, 2019.

* cited by examiner

SIGNALING TIMING INFORMATION FOR A TIME SENSITIVE NETWORK IN A WIRELESS COMMUNICATIONS SYSTEM

CROSS REFERENCE

The present application for patent claims the benefit of U.S. Provisional Patent Application No. 62/719,580 by Joseph, et al., entitled "SIGNALING TIMING INFORMATION FOR A TIME SENSITIVE NETWORK IN A WIRELESS COMMUNICATIONS SYSTEM," filed Aug. 17, 2018, assigned to the assignee hereof, and expressly incorporated herein.

INTRODUCTION

The following relates generally to wireless communications, and more specifically to indicating timing information for a network in a wireless communications system.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A wireless multiple-access communications system may include a number of base stations or network access nodes, each simultaneously supporting communication for multiple communication devices, which may be otherwise known as user equipment (UE). In some cases, various applications (e.g., motion control, discrete manufacturing, etc.) may utilize strict timing between two endpoints for command and control communications. For example, a time sensitive network (TSN) may provide that various TSN endpoints within a TSN may have synchronized timing such that performance of functions (e.g., an industrial controller providing commands to a manufacturing robot) is synchronized between endpoints. In cases where all or a portion of a data flow supporting TSN endpoints is transmitted via a wireless multiple-access system, techniques for maintaining time synchronization between the TSN endpoints are needed.

SUMMARY

A method of wireless communication at a first node of a radio access network (RAN) is described. The method may include receiving a request for establishing a data flow with a UE, where the UE provides communication with one or more time sensitive network (TSN) endpoints via the first node of the RAN, receiving timing information for the data flow via one or more system messages associated with the data flow, and establishing the data flow based on the timing information.

An apparatus for wireless communication at a first node of a RAN is described. The apparatus may include a processor, memory in electronic communication with the processor, and instructions stored in the memory. The instructions may be executable by the processor to cause the apparatus to receive a request for establishing a data flow with a UE, where the UE provides communication with one or more TSN endpoints via the first node of the RAN, receive timing information for the data flow via one or more system messages associated with the data flow, and establish the data flow based on the timing information.

Another apparatus for wireless communication at a first node of a RAN is described. The apparatus may include means for receiving a request for establishing a data flow with a UE, where the UE provides communication with one or more TSN endpoints via the first node of the RAN, receiving timing information for the data flow via one or more system messages associated with the data flow, and establishing the data flow based on the timing information.

A non-transitory computer-readable medium storing code for wireless communication at a first node of a RAN is described. The code may include instructions executable by a processor to receive a request for establishing a data flow with a UE, where the UE provides communication with one or more TSN endpoints via the first node of the RAN, receive timing information for the data flow via one or more system messages associated with the data flow, and establish the data flow based on the timing information.

In some examples of the method, apparatuses, and non-transitory computer-readable medium described herein, the timing information may be provided by one or more of a TSN adaptation function, an access and mobility management function (AMF), a user plane function (UPF), a session management function (SMF), a policy control function (PCF), an application function, or any combinations thereof.

In some examples of the method, apparatuses, and non-transitory computer-readable medium described herein, the one or more system messages include a first system message from the TSN adaptation function to the PCF, a second system message from the PCF to the SMF, a third system message from the SMF to the AMF, and a fourth system message from the AMF to the UE. In some examples of the method, apparatuses, and non-transitory computer-readable medium described herein, the one or more system messages include a first system message from the TSN adaptation function to the PCF, a second system message from the PCF to the AMF, and third system message from the AMF to the UE.

In some examples of the method, apparatuses, and non-transitory computer-readable medium described herein, the establishing the data flow may include operations, features, means, or instructions for receiving a handover message from a second node in the RAN that the data flow may be to be handed over from the second node to the first node. In some examples of the method, apparatuses, and non-transitory computer-readable medium described herein, the first node of the RAN may be a base station or a user plane function (UPF) associated with the RAN.

In some examples of the method, apparatuses, and non-transitory computer-readable medium described herein, a TSN adaptation function, subscription information associated with the UE stored in one or more of a unified data repository (UDR), an authentication server function (AUSF), or a home subscriber server (HSS); or and preconfigured information provided by a network function or a RAN node.

In some examples of the method, apparatuses, and non-transitory computer-readable medium described herein, the timing information includes a time offset indication associated with communicating with the TSN endpoints. In some examples of the method, apparatuses, and non-transitory computer-readable medium described herein, the timing information further includes a traffic periodicity, one or more packet size parameters, or combinations thereof, associated with the data flow. In some examples of the method, apparatuses, and non-transitory computer-readable medium described herein, the timing information further includes one or more of an uplink time offset, a downlink time offset, or a time offset associated with a first TSN endpoint of the TSN endpoints. In some examples of the method, apparatuses, and non-transitory computer-readable medium described herein, the time offset indication includes one or more of a time offset start indication, a time offset end indication, a time offset duration indication, or a packet delivery deadline indication. In some examples of the method, apparatuses, and non-transitory computer-readable medium described herein, the time offset indication may be determined with respect to a TSN time reference, and where the TSN time reference may be one of one or more TSN time references associated with the RAN.

In some examples of the method, apparatuses, and non-transitory computer-readable medium described herein, the timing information may be included with configuration information for the data flow, and where the configuration information may be included in one or more of a quality of service (QoS) profile associated with the data flow, one or more QoS rules associated with the data flow, or one or more packet detection rules (PDRs) associated with the data flow.

A method of wireless communication is described. The method may include establishing a data flow via a first node associated with a RAN for a communication between one or more TSN endpoints, receiving timing information for the data flow via one or more system messages associated with the data flow, the timing information associated with a TSN and at least one TSN adaptation function associated with the RAN, and relaying the timing information to one or more other nodes associated with the RAN.

An apparatus for wireless communication is described. The apparatus may include a processor, memory in electronic communication with the processor, and instructions stored in the memory. The instructions may be executable by the processor to cause the apparatus to establish a data flow via a first node associated with a RAN for a communication between one or more TSN endpoints, receive timing information for the data flow via one or more system messages associated with the data flow, the timing information associated with a TSN and at least one TSN adaptation function associated with the RAN, and relay the timing information to one or more other nodes associated with the RAN.

Another apparatus for wireless communication is described. The apparatus may include means for establishing a data flow via a first node associated with a RAN for a communication between one or more TSN endpoints, receiving timing information for the data flow via one or more system messages associated with the data flow, the timing information associated with a TSN and at least one TSN adaptation function associated with the RAN, and relaying the timing information to one or more other nodes associated with the RAN.

A non-transitory computer-readable medium storing code for wireless communication is described. The code may include instructions executable by a processor to establish a data flow via a first node associated with a RAN for a communication between one or more TSN endpoints, receive timing information for the data flow via one or more system messages associated with the data flow, the timing information associated with a TSN and at least one TSN adaptation function associated with the RAN, and relay the timing information to one or more other nodes associated with the RAN.

Some examples of the method, apparatuses, and non-transitory computer-readable medium described herein may further include operations, features, means, or instructions for providing for communications between one or more TSN endpoints, based on the timing information, to provide at least a portion of the data flow.

In some examples of the method, apparatuses, and non-transitory computer-readable medium described herein, the method may be performed by a network function associated with the RAN, and where the network function includes an AMF, a UPF, a SMF, a PCF, an application function, or any combinations thereof.

In some examples of the method, apparatuses, and non-transitory computer-readable medium described herein, the receiving the timing information may include operations, features, means, or instructions for receiving a system message from a network function associated with the first node; or and receiving a system message from a different node in the RAN.

In some examples of the method, apparatuses, and non-transitory computer-readable medium described herein, the establishing the data flow may include operations, features, means, or instructions for receiving a handover message from a second node in the RAN that the data flow may be to be handed over from the second node to the first node; or receiving a handover message from a network function associated with the RAN that an aspect related to the data flow may be to be handed over from the network function to a different network function.

In some examples of the method, apparatuses, and non-transitory computer-readable medium described herein, the first node of the RAN may be a base station or a UPF associated with the RAN.

In some examples of the method, apparatuses, and non-transitory computer-readable medium described herein, the TSN adaptation function, subscription information associated with the UE stored in one or more of a UDR, an AUSF, or a HSS; or preconfigured information provided by a network function or a RAN node.

In some examples of the method, apparatuses, and non-transitory computer-readable medium described herein, the timing information includes a time offset indication associated with communicating between the TSN endpoints. In some examples of the method, apparatuses, and non-transitory computer-readable medium described herein, the timing information further includes a traffic periodicity, one or more packet size parameters, or combinations thereof, that may be associated with the data flow. In some examples of the method, apparatuses, and non-transitory computer-readable medium described herein, the timing information further includes one or more of an uplink, a downlink time offset, or a time offset associated with a first TSN endpoint of the TSN endpoints. In some examples of the method, apparatuses, and non-transitory computer-readable medium described herein, the time offset indication includes one or more of a time offset start indication, a time offset end indication, a time offset duration indication, and a packet delivery deadline indication. In some examples of the method, apparatuses, and non-transitory computer-readable medium described herein, the time offset indication may be determined with respect to a TSN time reference, and where the TSN time reference may be one of one or more TSN time references associated with the RAN.

In some examples of the method, apparatuses, and non-transitory computer-readable medium described herein, the timing information may be included with configuration information for the data flow, and where the configuration information may be included in one or more of a QoS profile associated with the data flow, one or more QoS rules associated with the data flow, or one or more PDRs associated with the data flow.

DETAILED DESCRIPTION

Figure 1:
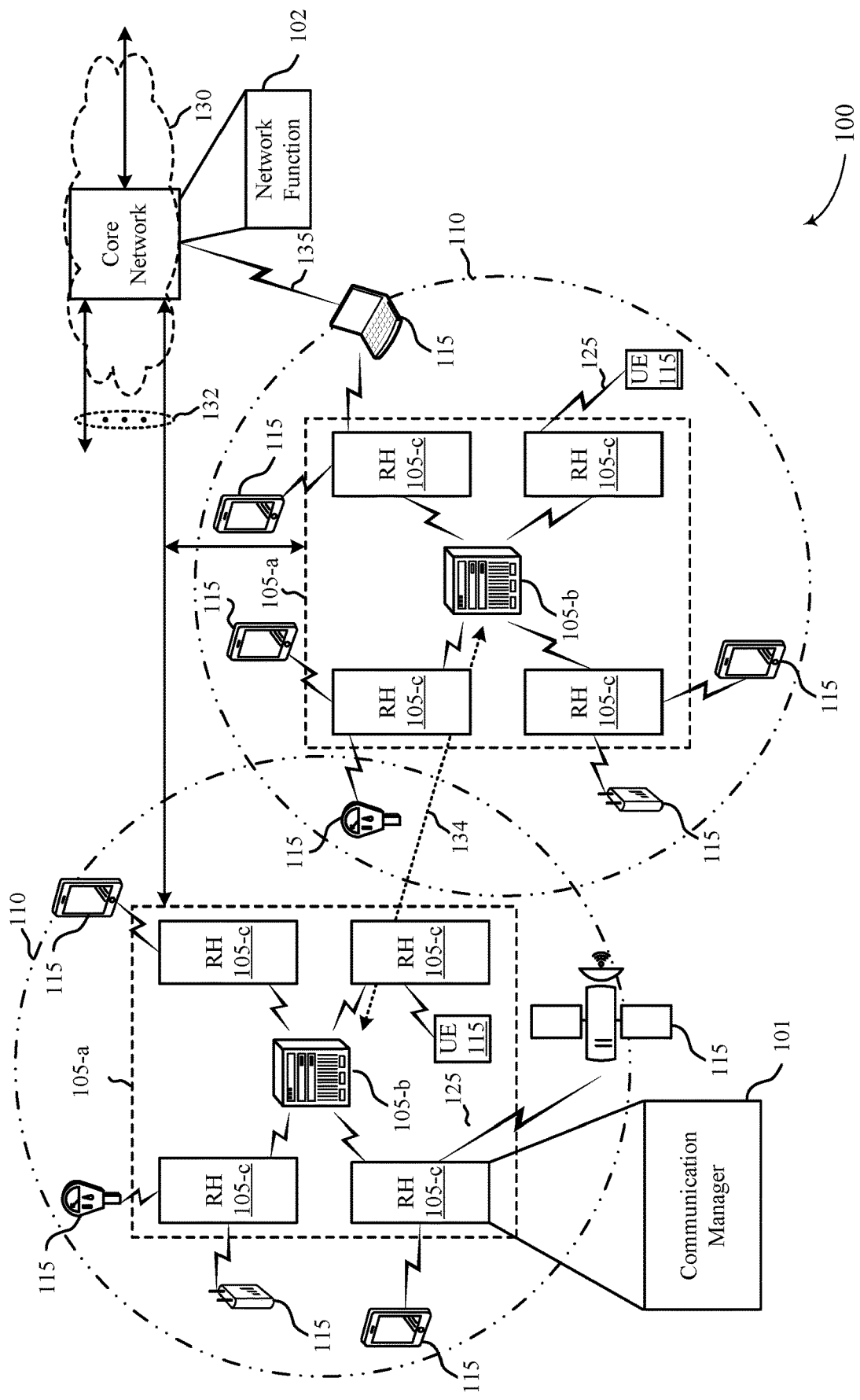
FIG. 1 illustrates an example of a system for wireless communications that supports signaling timing information for a time sensitive network in a wireless communications system in accordance with aspects of the present disclosure.

Some wireless communications systems may be used to facilitate communications in networks that rely on relatively strict timing synchronization of network components, sometimes referred to as time sensitive network (TSN) systems. Such systems may be used to support, for example, factory automation. Some TSN systems specify relatively stringent quality of service (QoS) parameters, such as latency, jitter and reliability requirements for data traffic (e.g., less than 1 ms latency and $10^{-6}$ reliability). In some cases, such data traffic may be supported in a wireless communications system using a high reliability service, such as an ultra-reliable low latency communication (URLLC) service.

Various aspects of the present disclosure provide for timing synchronization among one or more TSN endpoints via a wireless communications network. In some cases, a data flow may be established via the wireless communications network, in which one or more system messages associated with the data flow may provide timing information for the data flow. In some cases, a first node within the wireless communications network (e.g., a base station or gNB, a central unit, or a user plane function (UPF) associated with the wireless communications network) may receive a request for establishing such a data flow with a user equipment (UE), where the UE may provide communication with one or more TSN endpoints node via the first node. The first node may receive timing information for the data flow via one or more system messages associated with the data flow, and establish the data flow based at least in part on the timing information. In some cases, the timing information may be provided by one or more of a TSN adaptation function, an access and mobility management function (AMF), a user plane function (UPF), a session management function (SMF), a policy control function (PCF), an application function, or any combinations thereof. In some cases, the timing information may be included with configuration information for the data flow, and the configuration information may be included in one or more of a quality of service (QoS) profile associated with the data flow, one or more QoS rules associated with the data flow, or one or more packet detection rules (PDRs) associated with the data flow.

In some cases, the first node or a first network function may establish the data flow based on receiving a handover message from a different node or network function, indicating that the data flow is to be handed over from a different node to the first node or first network function. In some cases, the first node or first network function may receive a handover message from a different node or network function that indicates that an aspect related to the data flow is to be handed over from to the first node or first network function. In some cases, the aspect related to the data flow may include one or more of communicating the data flow (e.g., communicating TSN data associated with the data flow based on the handover message), communicating control or configuration information related to the data flow (e.g., communicating only one or more system messages with control or configuration information), or communicating a status information related to the data flow.

In some aspects a network function associated with a wireless communications system may perform various timing-related functions associated with a data flow of a TSN system. In some cases, the data flow may be established in part via a first node associated with a radio access network (RAN), and the network function may receive timing information for the data flow via one or more system messages associated with the data flow. Such timing information may be associated with a TSN and at least one TSN adaptation function associated with the RAN. The network function may relay the timing information to one or more other nodes associated with the RAN to provide at least a portion of the data flow and thereby facilitate communications among one or more TSN endpoints.

Such techniques may provide timing information in a TSN system, and may allow for time aware scheduling for communications within the wireless communications system and with different TSN endpoints. Thus, for a given TSN flow, the wireless communications network may perform scheduling for the TSN flow (e.g., scheduling of uplink and downlink transmissions for a UE that is coupled with a TSN endpoint) based on timing characteristics of the TSN flow. For instance, this can be used to configure semi-persistent scheduling (SPS) or configured scheduling (CS) for one or more UEs.

Aspects of the disclosure are initially described in the context of a wireless communications system. Aspects of the disclosure are further illustrated by and described with reference to apparatus diagrams, system diagrams, and flowcharts that relate to signaling timing information for a time sensitive network in a wireless communications system.

FIG. 1 illustrates an example of a wireless communications system 100 that supports signaling timing information for a time sensitive network in a wireless communications system in accordance with one or more aspects of the present disclosure. The wireless communications system 100 includes network devices 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Network devices 105 may wirelessly communicate with UEs 115 via one or more base station antennas. Network devices 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include network devices 105 of different types (e.g., macro or small cell base stations). The UEs 115 described herein may be able to communicate with various types of network devices 105 and network equipment including macro eNBs, small cell eNBs, gNBs, relay base stations, and the like.

Each network device 105 may be associated with a particular geographic coverage area 110 in which communications with various UEs 115 is supported. Each network device 105 may provide communication coverage for a respective geographic coverage area 110 via communication links 125, and communication links 125 between a network device 105 and a UE 115 may utilize one or more carriers. Communication links 125 shown in wireless communications system 100 may include uplink transmissions from a UE 115 to a network device 105, or downlink transmissions from a network device 105 to a UE 115. Downlink transmissions may also be called forward link transmissions while uplink transmissions may also be called reverse link transmissions.

The geographic coverage area 110 for a network device 105 may be divided into sectors making up only a portion of the geographic coverage area 110, and each sector may be associated with a cell. For example, each network device 105 may provide communication coverage for a macro cell, a small cell, a hot spot, or other types of cells, or various combinations thereof. In some examples, a network device 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same network device 105 or by different network devices 105. The wireless communications system 100 may include, for example, a heterogeneous LTE/LTE-A/LTE-A Pro or NR network in which different types of network devices 105 provide coverage for various geographic coverage areas 110.

The term "cell" refers to a logical communication entity used for communication with a network device 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a network device 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a network device 105. Other UEs 115 in such a group may be outside the geographic coverage area 110 of a network device 105, or be otherwise unable to receive transmissions from a network device 105. In some cases, groups of UEs 115 communicating via D2D communications may utilize a one-to-many (1:M) system in which each UE 115 transmits to every other UE 115 in the group. In some cases, a network device 105 facilitates the scheduling of resources for D2D communications. In other cases, D2D communications are carried out between UEs 115 without the involvement of a network device 105.

At least some of the network devices 105 (e.g., network device 105-a), which may be an example of a base station (e.g., eNB, network access devices, gNB), or network device 105-b, which may be an example of an access node controller (ANC)), may interface with the core network 130 through backhaul links 132 (e.g., S1, S2) and may perform radio configuration and scheduling for communication with the UEs 115. In various examples, the network devices 105-b may communicate, either directly or indirectly (e.g., through core network 130), with each other over backhaul links 134 (e.g., X1, X2), which may be wired or wireless communication links.

Each network device 105-b may also additionally or alternatively communicate with a number of UEs 115 through a number of other network devices 105-c, where network device 105-c may be an example of a smart radio head (or through a number of smart radio heads). In alternative configurations, various functions of each network device 105 may be distributed across various network devices 105 (e.g., radio heads and access network controllers) or consolidated into a single network device 105 (e.g., a base station).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by network devices 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service. The core network 130 may be a 5G core network (5GC).

At least some of the network devices, such as a network device 105, may include subcomponents such as an access network entity, which may be an example of an access node controller (ANC). Other examples of subcomponents include a central unit (CU) and a one or more distributed unit (DUs). The network device 105 may be a gNB or an eNB. Each access network entity may communicate with UEs 115 through a number of other access network transmission entities, which may be referred to as a radio head, a smart radio head, or a transmission/reception point (TRP). In some configurations, various functions of each access network entity or network device 105 may be distributed across various network devices (e.g., radio heads and access network controllers) or consolidated into a single network device (e.g., a network device 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and network devices 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as network devices 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, network device 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a network device 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a network device 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARM) to provide retransmission at the MAC layer to improve link efficiency. In the control plane, the Radio Resource Control (RRC) protocol layer may provide establishment, configuration, and maintenance of an RRC connection between a UE 115 and a network device 105 or core network 130 supporting radio bearers for user plane data. At the Physical (PHY) layer, transport channels may be mapped to physical channels.

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

In some aspects of the present disclosure, one or more UEs 115 or other network devices may be coupled with one or more TSN endpoints. Timing synchronization among one or more TSN endpoints in communication with each other via wireless communications network 100 may be provided by establishing a QoS flow via a portion of the wireless communication network 100 that carries TSN data. In some cases, timing information for the QoS flow associated with a TSN flow carried via a UE 115 may be sent (e.g., via the communication links 125, the backhaul links 132, the backhaul links 134, etc.) from a TSN adaptation function associated with the wireless communications system 100 to one of a RAN node associated with the UE 115, the UE 115 or a UPF associated with the UE 115 using one or more system messages associated with the QoS flow. Such techniques may provide timing information in a TSN system, and may allow for time aware scheduling for communications among two or more nodes within the wireless communications system 100 and with different TSN endpoints. The RAN node may be a base station, a gNB, a cell, an eNB, a CU, or a DU. The RAN node may be one node of a RAN that comprises one or more of a plurality of base stations, a plurality of gNBs, a plurality of cells, a plurality of eNBs, a plurality of CUs or a plurality of DUs.

In some cases, one or more of the network devices 105 may be a first node in the wireless communications system 100 and may include a communications manager 101, which may receive a request for establishing a data flow with a UE 115, where the UE 115 may provide communication with one or more TSN endpoints via the first node. The first node may receive timing information for the data flow via one or more system messages associated with the data flow, and establish the data flow based at least in part on the timing information. In some cases, the timing information may be provided by one or more of a TSN adaptation function, an access and mobility management function (AMF), a user plane function (UPF), a session management function (SMF), a policy control function (PCF), an application function, or any combinations thereof. In some cases, the timing information may be included with configuration information for the data flow, and the configuration information may be included in one or more of a QoS profile associated with the data flow, one or more QoS rules associated with the data flow, or one or more PDRs associated with the data flow.

In some cases, one or more devices within the wireless communications system 100 may include a network function 102. In the example of FIG. 1, the network function 102 is illustrated as being associated with the core network 130, and such a network function 102 may be part of the core network 130 or a separate device that is associated with the wireless communication system 100 (e.g., a programmable logic controller (PLC) that runs a TSN adaptation function). In some cases, a number of different network functions 102 may be provided on a number of different nodes within the wireless communications system 100. The network function 102 may perform various timing-related functions associated with a data flow of a TSN system associated with the wireless communications system 100. In some cases, the data flow may be established via a first node (e.g., a network device 105), and the network function 102 may receive timing information for the data flow via one or more system messages associated with the data flow. Such timing information may be associated with a TSN and at least one TSN adaptation function associated with the wireless communications network 100. The network function 102 may relay the timing information to one or more other nodes to provide at least a portion of the data flow and thereby facilitate communications among one or more TSN endpoints.

Figure 2:
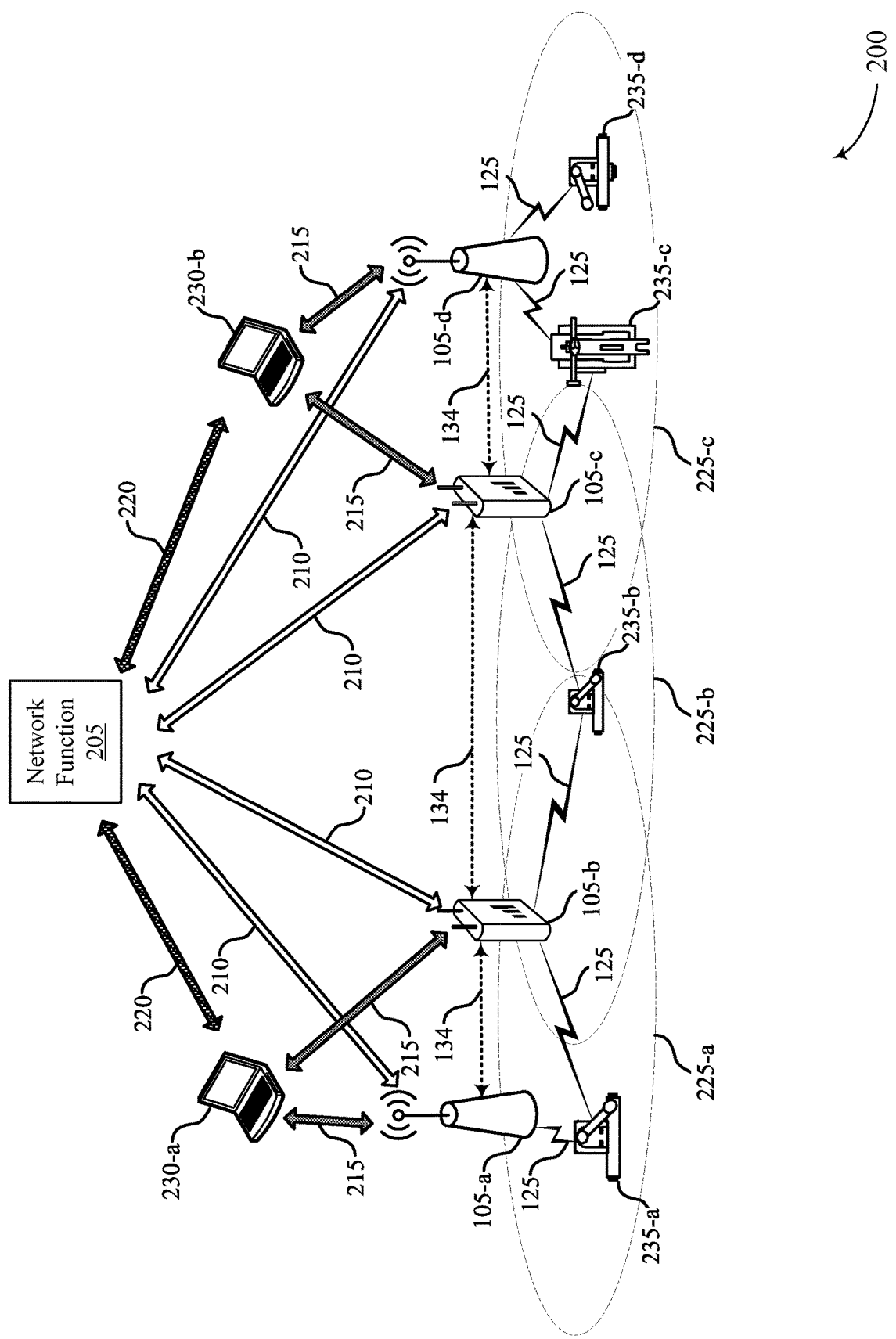
FIG. 2 illustrates an example of a portion of a wireless communications system that supports signaling timing information for a time sensitive network in a wireless communications system in accordance with aspects of the present disclosure.

FIG. 2 illustrates an example of a portion of a wireless communications system 200 that supports signaling timing information for a time sensitive network in a wireless communications system in accordance with one or more aspects of the present disclosure. In some examples, wireless communications system 200 may implement aspects of wireless communications system 100. The wireless communications system 200 may be an example of a TSN system. In wireless communications system 200, a network function 205 (e.g., a grand master TSN function, a multicell/multicast coordination entity (MCE), a node within the core network 130, the network function 102, a TSN adaptation function, etc.) may facilitate the exchange of timing information associated with a QoS flow that provides a TSN data flow between two or more devices within the wireless communications system 200. In some cases, the wireless communications system 200 may be located in an industrial setting, and each of the devices 235 may be a UE coupled with a piece of equipment that may be a TSN endpoint within the industrial setting, although techniques provided herein may be used in any on a number of other deployment scenarios.

In the example of FIG. 2, a number of coverage areas 225 may each include multiple TRPs 105 capable of communicating with one or more devices 235 within the coverage area 225. The TRPs 105 may be any one of a base station, an eNB, a gNB, an IoT gateway, a cell, etc. The TRPs 105 may communicate with a management system (e.g., a network function 205) via links 210. The management system may include, for example, an industrial PC which may provide controller programming for TSN endpoints in devices 235, software and security management of the wireless communications system 200, long term key performance indicator (KPI) monitoring, among other functions. In some cases, the management system may include a TSN grandmaster clock that is used for synchronizing one or more network nodes or TSN endpoints.

In the example of FIG. 2, the TRPs 105 may also communicate with human-machine-interfaces (HMIs) 230 via communications links 215 and HMIs 230 may communicate with network function 205 (or other management system) via links 220. HMIs 230 may include, for example, tablet computers, control panels, wearable devices, control computers, and the like, which may provide control for different equipment within the system (e.g., start/stop control, mode change control, augmented or virtual reality control, etc., for a device 235 that may include a TSN endpoint and UE).

In some cases, one or more programmable logic controllers (PLCs) may be associated with one or more TRPs 105 and may issue a series of commands (e.g., motion commands for a piece of equipment), receive sensor inputs (e.g., position of a robotic arm of a piece of equipment), and coordinate with other PLCs. In such cases, the wireless communications between the TRPs 105, devices 235, HMIs 230, network function 205, and/or one or more other network functions or nodes may need to provide near real-time information as part of a TSN. In some cases, wireless communications system 200 may provide for TSN data flows and for timing synchronization among one or more TSN endpoints.

In some cases, a data flow may be established via the wireless communications system 200, in which one or more system messages associated with the data flow may provide timing information for the data flow. Such a data flow may include or be associated with, for example, one or more QoS flows, one or more protocol data units (PDUs), one or more radio bearers, one or more radio link control (RLC) channels, one or more logical channels, one or more transport channels, or any combinations thereof. Additionally, the one or more system messages may include one or more network access stratum (NAS) messages, one or more access stratum (AS) messages, one or more messages exchanged between two network functions in the wireless communications system 200, one or more messages exchanged between two entities in the wireless communications system 200, or any combinations thereof.

Figure 3:
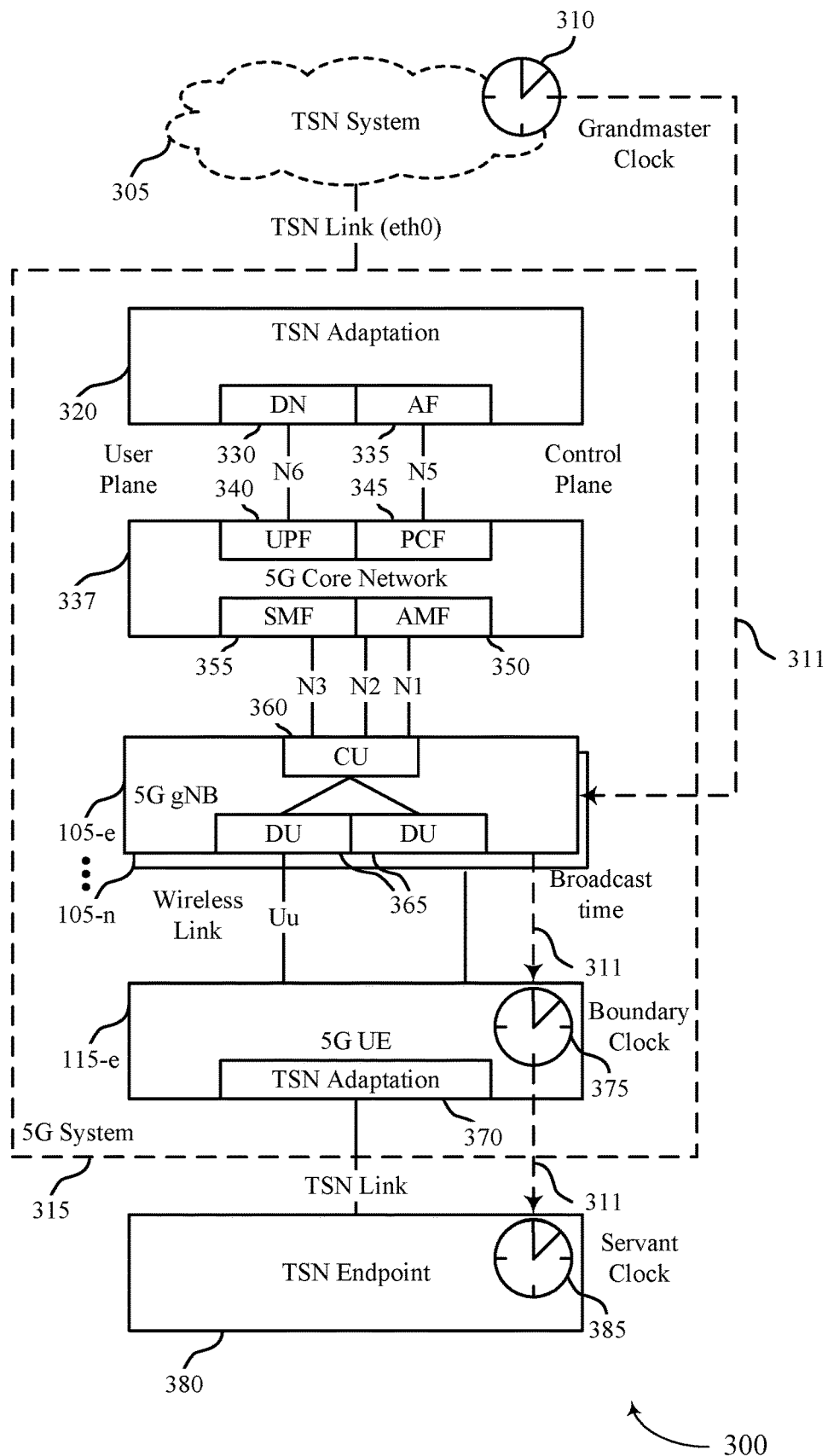
FIG. 3 illustrates an example of a wireless communications system that supports signaling timing information for a time sensitive network in accordance with aspects of the present disclosure.

FIG. 3 illustrates an example of wireless communications system 300 that supports signaling timing information for a time sensitive network in accordance with one or more aspects of the present disclosure. In some examples, wireless communications system 300 may implement aspects of wireless communications system 100 or 200. In this example, a TSN system 305 may include a grandmaster clock 310 and may be coupled with a 5G system (5GS) 315 (e.g., a 5G or NR RAN) that may include a number of network functions and network nodes.

In the example of FIG. 3, the 5GS 315 may include a TSN adaptation function 320 that may provide an interface between the 5GS 315 and the TSN system 305 (e.g., via a TSN link (eth0), etc.). The TSN adaptation function 320 may include a data network (DN) function 330 and an application function (AF) 335. 5GS 315 also may include a core network 337, a number of network devices 105-*e* through 105-*n*, and one or more UEs 115-*e*. The network devices 105-*e* through 105-*n* may comprise a RAN in the 5GS 315. In this example, core network 337 may include a user plane function (UPF) 340, a policy control function (PCF) 345, an access and mobility management function (AMF) 350, and a session management function (SMF) 355. In this example, DN function 330 and UPF 340 may exchange user plane data via interface N6, and AF 335 and PCF may exchange control plane data via interface N5. One or more of the network devices 105 may include a central unit (CU) 360, and multiple distributed units (DUs) 365. Backhaul links N1, N2, and N3, may connect the CU 360 with SMF 355 and AMF 350. The UE 115-e may have a wireless link Uu with a DU 365, and may have a UE TSN adaptation function 370 that provides an interface with TSN endpoint 380 via a TSN link.

In this example, one or more of the network devices 105 may receive timing information from grandmaster clock 310, which may be provided by one or more system messages between the TSN adaptation function 320 and CU 360, for example. The UE 115-e may have an established connection with network device 105-e, and in turn receive timing information via the network device 105-e and establish a boundary clock 375 that is synchronized with a servant clock 385 at the TSN endpoint 380. In some cases, the UE 115-e may be incorporated as part of TSN endpoint 380. In other cases, the UE 115-e may not be incorporates as part of a TSN endpoint, and may carry data between two TSN endpoints.

In some cases, a data flow may be established in the RAN which may provide a TSN flow between TSN system 305 and TSN endpoint 380 (e.g., a sensor/actuator (S/A) device). In some cases, the TSN system 305 may include a controller, such as a PLC, such that the TSN flow is provided between two TSN endpoints (e.g., the PLC and S/A). Timing information associated with the data flow may provide for synchronization of the boundary clock 375, the servant clock 385, and the grandmaster clock 310. Such timing information, as discussed above, may be provided via one or more system messages 311. In some cases, the system messages 311 may include one or more messages amongst a first set of network functions, one or messages between a second set of network functions and a RAN, or one or messages amongst a third set of network functions and the UE. In some cases, the first, second and third set of network functions may comprise of one or more of a plurality of AMFs 350, a plurality of UPFs 340, a plurality of SMFs 355, a plurality of PCFs 345, a plurality of AFs 335, or any combinations thereof. For example, system messages 311 may include a message from AF 335 to a PCF 345, a message from PCF 345 to SMF 355, a message from SMF 355 to AMF 350, and a message from AMF 350 to network device 105-e (and/or one or more other network devices 105). In other examples, the system messages 311 may include a message from AF 335 to PCF 345, a message from PCF 345 to AMF 350, and a message from AMF 350 to UE 115-e (via a network device 105).

The timing information provided by the system messages, as indicated above, may allow for timing synchronization between TSN endpoints. In some cases, the timing information for the QoS flow comprises time offset information. Additionally, in some cases, the timing information may include one or more of traffic periodicity or packet size parameters. Traffic periodicity may be, for example, a periodicity of generation of packets by TSN endpoint 380 and/or a different TSN endpoint within the TSN system 305. In some cases, the time offset information may include one or more time offset pairs, which may correspond to paired direction parameters (e.g., uplink/downlink, PLC-to-S/A or S/A-to-PLC, etc.). In some cases, time offset information may include one or more of a time offset start indication (e.g., a timestamp), a time offset end indication (e.g., a timestamp), a time offset duration indication (e.g., a time duration), or a packet delivery deadline indication. In some examples, the packet delivery deadline may indicate a deadline time by which a packet associated with the data flow is to be sent by the UE or delivered to the UE. The packet delivery deadline may be determined, in some examples, based on $$n*Periodicity+Offset+latency\_tolerence,$$

for an integer n where the parameters Periodicity, Offset and latency_tolerance may be provided in one or more system information messages. In some cases, the time offset information may have a granularity of milliseconds, microseconds or nanoseconds.

In some cases, the time offset indication may be determined with respect to a TSN time reference (e.g., with respect to grandmaster clock 310, boundary clock 375, or servant clock 385). For example, the time offset indication may specify arrival of packets "n" at time t=n*Periodicity+Offset, wherein the reference for the time "t" is the TSN time reference.

In some cases, as indicated above, the timing information may be included in configuration information for the QoS flow contained in the system messages 311. For example, the configuration information may be included in one or more of a QoS profile associated with the QoS flow (e.g., a modified version of a profile defined in 3GPP TS 23.501), one or more QoS rules (e.g., a modified version of QoS rules defined in 3GPP TS 23.501), one or more uplink or downlink Packet Detection Rules (PDRs), or any combinations thereof. In some cases, the timing information may be provided by one or more of the TSN adaptation function 320, subscription information associated with the UE 115-e stored in one or more of a unified data repository (UDR), an authentication server function (AUSF), or a home subscriber server (HSS); or preconfigured information provided by a network function or a RAN node (e.g., information such as backhaul capacity of various wireline links in the 5GS 315 that may be used to determine the time taken by a data packet to traverse from the TSN adaptation function 320 to a network device 105).

In some cases, the timing information that is received from the TSN adaptation function 320 may be used at a network device 105, the core network 337, or both, to determine scheduling patterns for the UE 115-e, and one or more other UEs (e.g., using SPS/CS). In some examples, the RAN may use the received timing information to determine grants for transmissions of traffic that meets associated delay requirements. In some examples, the timing information may be used to schedule dynamic grants, such as uplink grants or downlink grants to the UE 115-e. Additionally or alternatively, the RAN may configure a period and an offset of the SPS or an uplink configured grant based on the received timing information. In some examples, the RAN may schedule non-TSN traffic based on the received timing information. In some cases, the RAN may use the timing information to provide admission control for the UE 115-e and for one or more other UEs. For example, based on the timing information, the RAN may determine to admit the UE 115-e or one or more other UEs to be served by the RAN or an associated RAN node. In some examples, the UE 115-e may not be admitted to a network node (e.g., gNB) if time periods corresponding to the provided time offset information and the period of the QoS flow of the UE 115-e overlaps with time periods of existing traffic at the network node. The RAN may implement admission control to avoid undesirable scenarios such as a network node admitting a UE when the network node is unable to meet the QoS requirements of the UE. In another aspect, admission control using the provided time offset information and the period of the QoS flow may allow the RAN to increase a number of admitted TSN flows.

Figure 4:
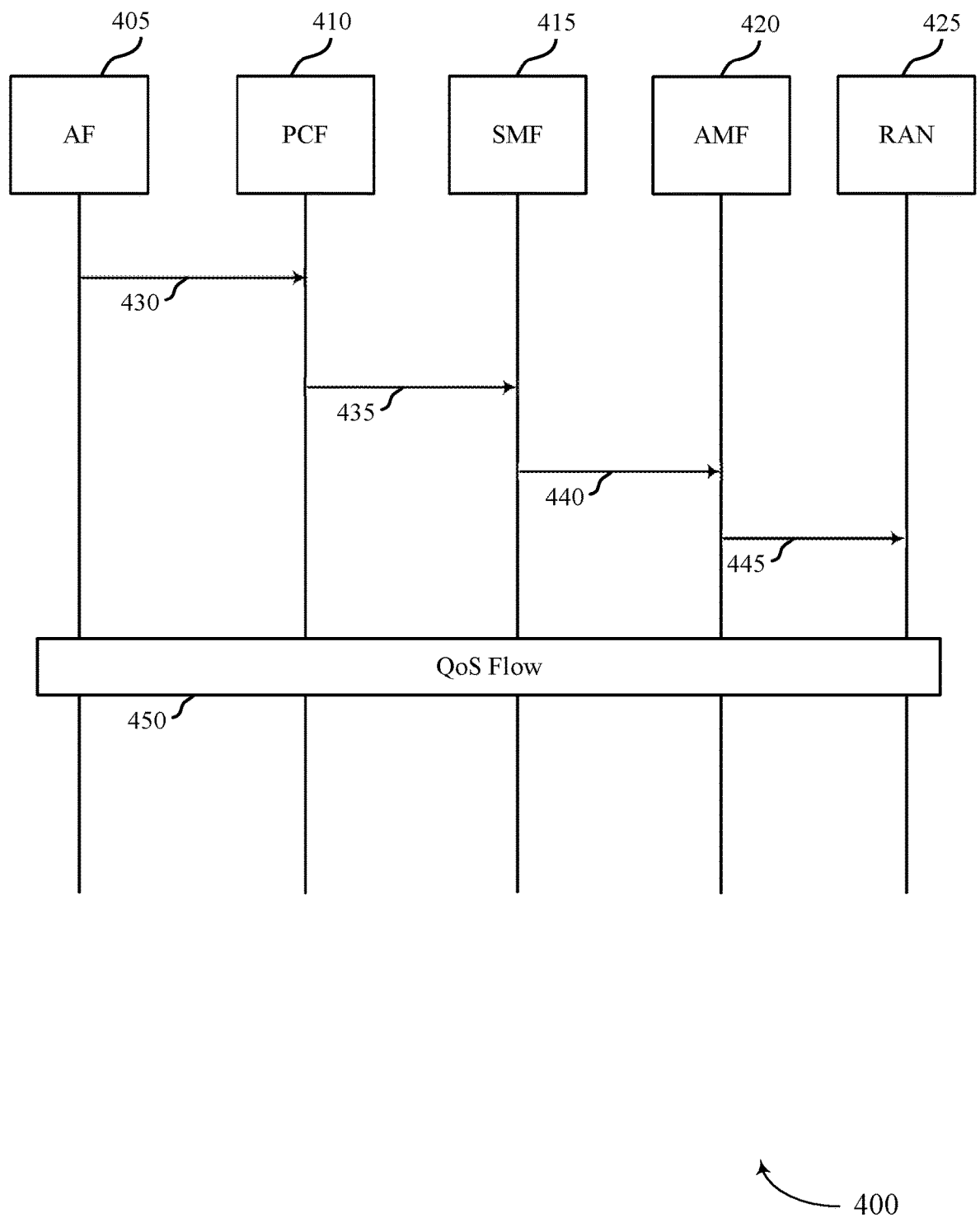
FIG. 4 illustrates an example of a process flow that supports signaling timing information for a time sensitive network in a wireless communications system in accordance with aspects of the present disclosure.

FIG. 4 illustrates an example of a process flow 400 that supports signaling timing information for a time sensitive network in a wireless communications system in accordance with one or more aspects of the present disclosure. In some examples, process flow 400 may implement aspects of wireless communications system 100, 200, or 300. As shown, process flow 400 may be implemented by an AF 405, PCF 410, SMF 415, AMF 420, and RAN 425, each of which may be examples of the corresponding functions or devices described herein.

In this example, the AF 405 (e.g., a TSN adaptation function) may transmit a first system message 430 to PCF 410. Such a system message 430 may provide timing information related to a QoS flow 450 that is to be established. In some cases, the timing information in the first system message 430 may be provided using a policy authorization service (e.g., using a modified version of a "Npcf_PolicyAuthorization" service such as defined in Rel-15 3GPP TS 29.514). In some cases, the timing information in the first system message 430 may be provided in a data type (e.g., using a modified version of an "AppSessionContextReqData" data type or a "AppSessionContextUpdateData" data type as defined in Rel-15 3GPP TS 29.514). In some cases, the timing information in the first system message 430 may be provided using an information element (IE) in a data field (e.g., in an IE that is defined to provide timing information within "medComponents" as defined in Rel-15 3GPP TS 29.514. In other cases, the timing information in the first system message 430 may be provided using an attribute value pair (AVP) (e.g., in a modified version of a "Media-Component-Description" AVP or a "Media-Sub-Component" AVP or another AVP sent using a receive reference point, such as defined in Rel-15 3GPP TS 29.214).

Continuing with the process flow 400 of FIG. 4, the PCF 410 may receive the first system message 430, and format the timing information into a second system message 435 that is provided to SMF 415. In some cases, the second system message 435 may use an application programming interface (API) that includes one or more rules that define the timing information. For example, the second system message 435 SMF may use a modified form of a Npcf_SMPolicyControl API defined in Rel-15 3GPP TS 29.512 that may include a policy and charging control (PCC) rule that includes the timing information (e.g., the timing information may be contained in a modified form of QoSData data structure within the "refQosData" attribute as defined in Rel-15 3GPP TS 29.512).

The SMF 415 may receive the second system message 435, and format the timing information into a third system message 440 that is provided to AMF 420. In some cases, the third system message 440 may use one or more service operations of a session service, or a QoS profile attribute to provide the timing information. For example, the third message 440 may use a modified form of Nsmf_PDUSession service defined in Rel-15 3GPP TS 29.502 and a modified form of one or more of a "Create SM Context," "Update SM Context," "Create," or "Update" service operation defined in Rel-15 3GPP TS 29.502 to indicate the timing information. In some cases, the third message may use a modified form of a service operation associated with Namf_PDUSession service discussed in Rel-15 3GPP TS 23.502. Additionally or alternatively, the third system message 440 may use a defined QosFlowProfile attribute included in a QosFlowSetupItem or a QosFlowAddModifyRequestItem to indicate the timing information.

The AMF 420 may receive the third system message 440, and format the timing information into a fourth system message 445 that is provided to RAN 425 (e.g., a base station and UE) to provide the timing information for QoS flow 450. In some cases, the fourth system message 445 may be a modified form of a "PDU Session Resource Setup Request" for a PDU session associated with the QoS flow (e.g., a modified form of the request as defined in 3GPP TS 38.413). In some cases, the timing information may be included in a defined "QoS Flow Level QoS Parameters" IE associated with the QoS flow contained in "PDU Session Resource Setup Request Transfer" (e.g., as defined in 3GPP TS 38.413). In some cases, the fourth system message 445 may be modified form of a "PDU Session Resource Modify Request Transfer" for a PDU session associated with the QoS flow, (e.g., a modified form of the request as defined in 3GPP TS 38.413). In some cases, the timing information may be included in a defined "QoS Flow Level QoS Parameters" IE associated with the QoS flow contained in a "PDU Session Resource Setup Request Transfer" (e.g., as defined in 3GPP TS 38.413). The timing information of the fourth system message 445 may be used, for example, by a UE to establish a boundary clock for use in time aware scheduling. In some cases, AF 405, PCF 410, SMF 415 or AMF 420 may not carry any data for the communication between TSN endpoints (e.g., TSN endpoints associated with the RAN 425) associated with the QoS flow 450, and may only carry one or more of a control information, a configuration information or a status information associated with the QoS flow 450.

Figure 5:
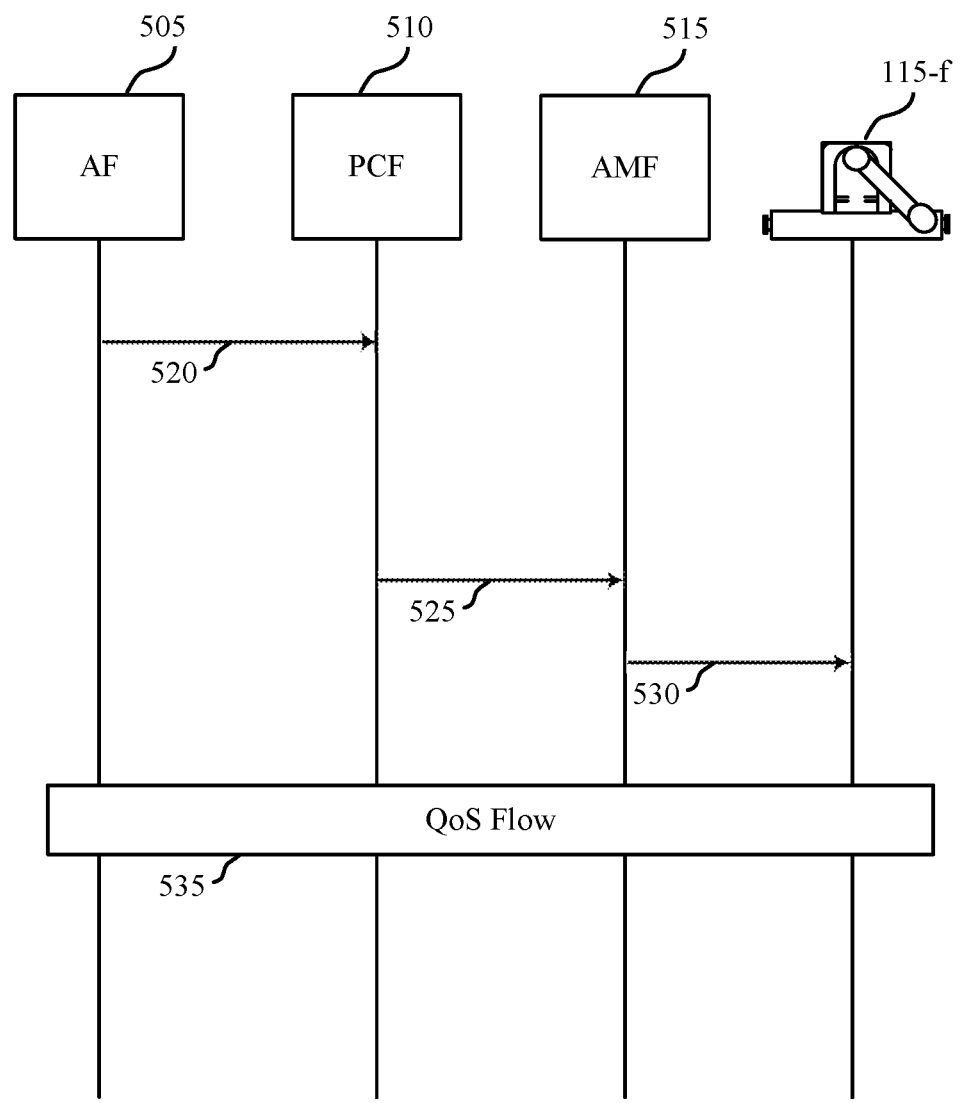
FIG. 5 illustrates an example of another process flow that supports signaling timing information for a time sensitive network in a wireless communications system in accordance with aspects of the present disclosure.

FIG. 5 illustrates an example of a process flow 500 that supports signaling timing information for a time sensitive network in a wireless communications system in accordance with one or more aspects of the present disclosure. In some examples, process flow 500 may implement aspects of wireless communications system 100, 200, or 300. As shown, process flow 500 may be implemented by an AF 505, PCF 510, AMF 515, and UE 115-f, each of which may be examples of the corresponding functions or devices described herein. In some cases, AF 505, PCF 510, or AMF 515 may not carry any data for the communication between TSN endpoints associated with the QoS flow 535, and may only carry one or more of a control information, a configuration information or a status information associated with the QoS flow 535.

In this example, the AF 505 (e.g., a TSN adaptation function) may transmit a first system message 520 to PCF 510. Such a first system message 520 may provide timing information related to a QoS flow 535 that is to be established. In some cases, the timing information in the first system message 520 may be provided using a policy authorization service, similarly as discussed above with respect to FIG. 4.

The PCF 510 may receive the first system message 520, and format the timing information into a second system message 525 that is provided to AMF 515. In some cases, the second system message 525 may use an API that includes one or more rules that define the timing information, similarly as discussed above with respect to FIG. 4.

The AMF 515 may receive the second system message 525, and format the timing information into a third system message 530 that is provided to the UE 115-*f*. The AMF 515 may provide the third system message 530 to the UE 115-*f*, for example, via a logical channel that is established between the AMF 515 and the UE 115-*f*. The timing information of the third system message 530 may be used, for example, by the UE 115-*f* to establish a boundary clock for use in time aware scheduling.

Figure 6:
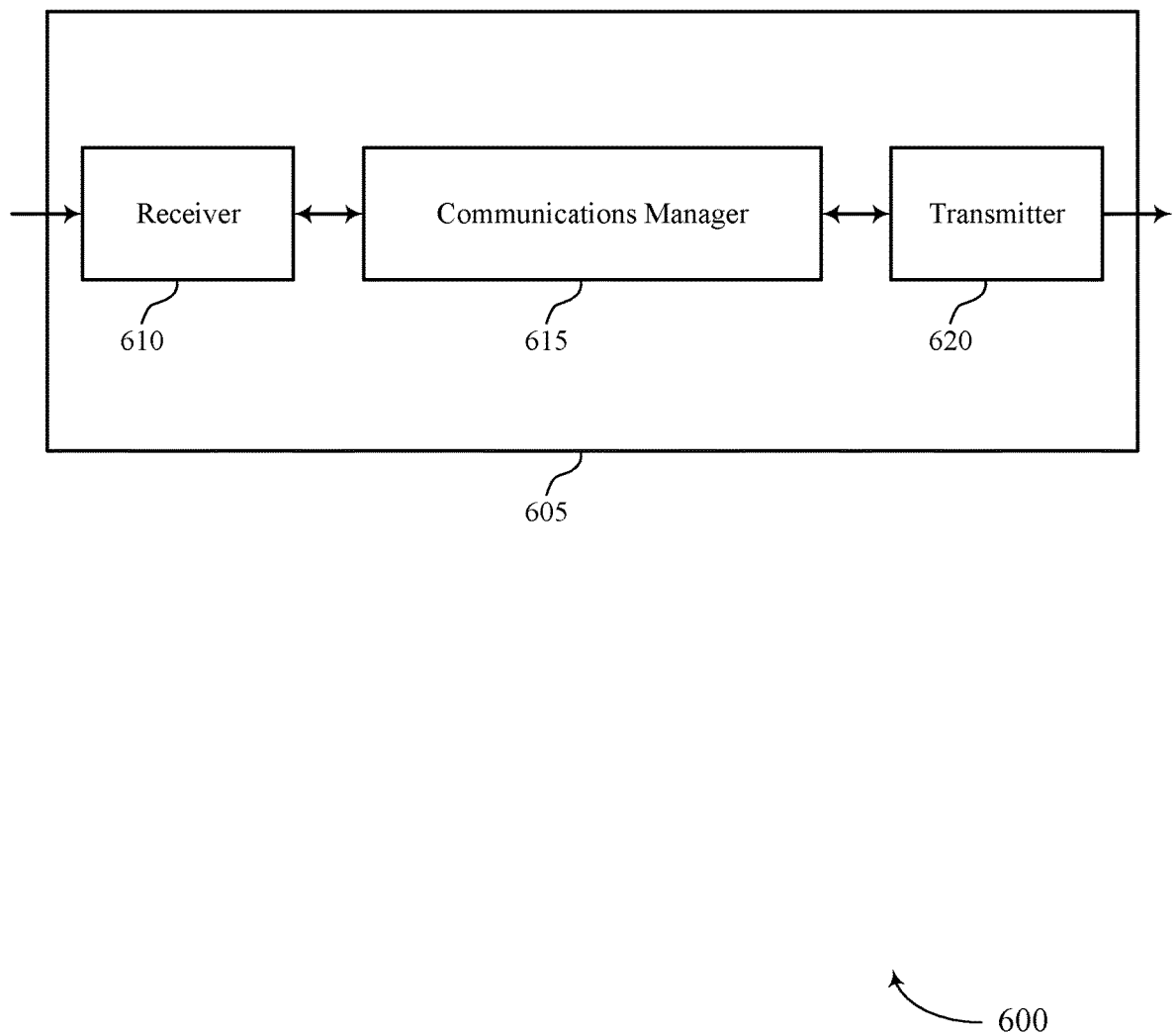
FIGS. 6 and 7 show block diagrams of devices that support signaling timing information for a time sensitive network in a wireless communications system in accordance with aspects of the present disclosure.

FIG. 6 shows a block diagram 600 of a device 605 that supports signaling timing information for a time sensitive network in a wireless communications system in accordance with one or more aspects of the present disclosure. The device 605 may be an example of aspects of a device as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to signaling timing information for a time sensitive network in a wireless communications system, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive a request for establishing a data flow with a UE, where the UE provides communication with one or more TSN endpoints via a first node of a RAN (e.g., a base station or gNB), establish the data flow based on the timing information, and receive timing information for the data flow via one or more system messages associated with the data flow. The actions performed by the communications manager 615 as described herein may be implemented to realize one or more potential advantages. One implementation may allow the first node of the RAN to communicate with UEs in the RAN more efficiently. For example, the first node of the RAN may dynamically schedule grants to the UEs for uplink and downlink transmissions according to the received timing information. In such cases, the dynamic scheduling may increase the likelihood of a successful detection of communications between the first node of the RAN and the UEs, reducing a number of retransmissions. Another implementation may provide improved quality and reliability of service at the UEs, as latency and the number of separate resources allocated to the UEs by the node of the RAN may be reduced. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
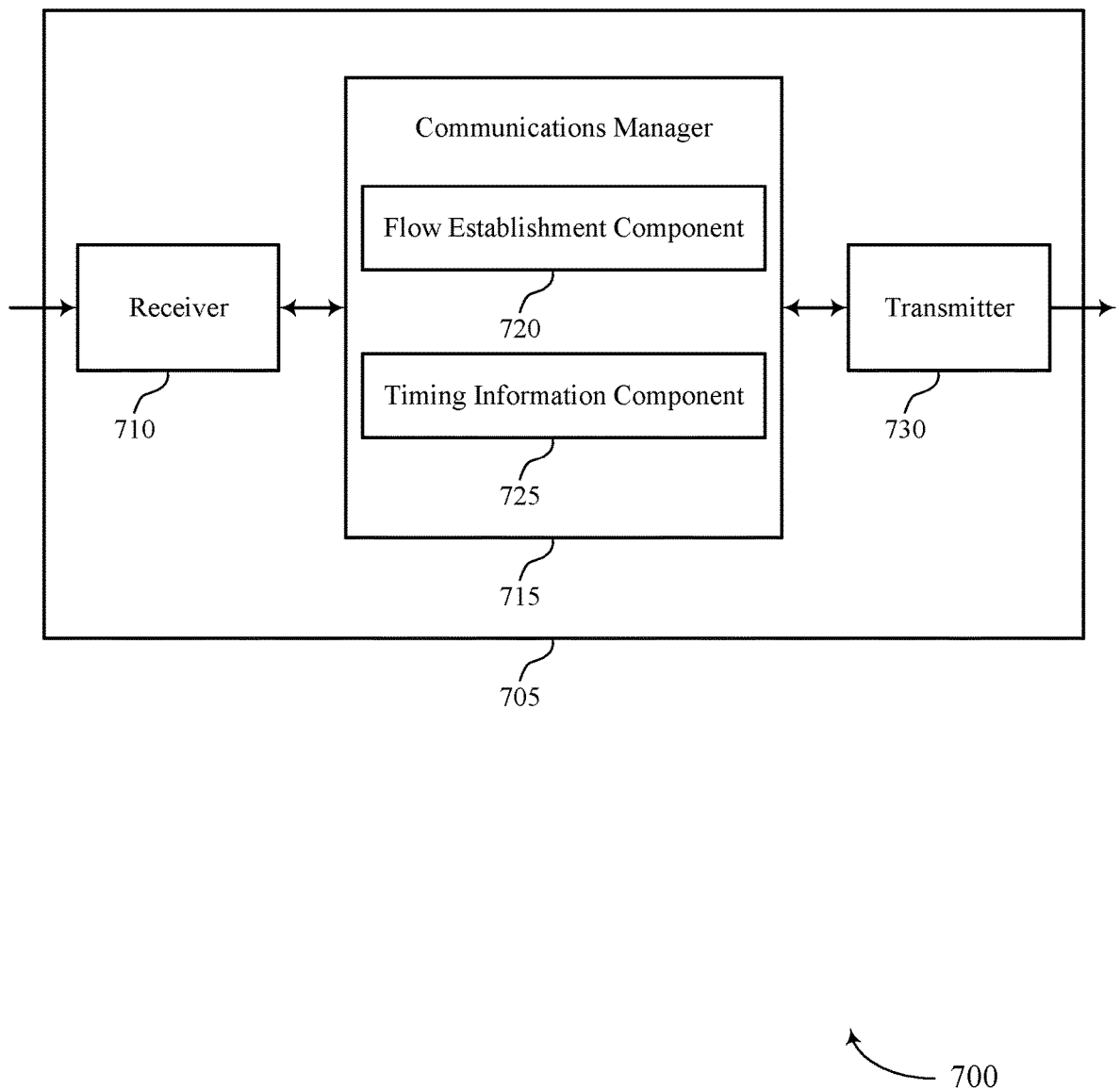

FIG. 7 shows a block diagram 700 of a device 705 that supports signaling timing information for a time sensitive network in a wireless communications system in accordance with one or more aspects of the present disclosure. The device 705 may be an example of aspects of a device 605 or a device 115 as described herein. The device 705 may include a receiver 710, a communications manager 715, and a transmitter 730. The device 705 may also include a processor. Each of these components may be in communication with one another (e.g., via one or more buses).

The receiver 710 may receive information such as packets, user data, or control information associated with various information channels (e.g., control channels, data channels, and information related to signaling timing information for a time sensitive network in a wireless communications system, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a flow establishment component 720 and a timing information component 725. The communications manager 715 may be an example of aspects of the communications manager 910 described herein.

The flow establishment component 720 may receive a request for establishing a data flow with a UE, where the UE provides communication with one or more TSN endpoints via the first node of the RAN, and establish the data flow based on timing information associated with the data flow.

The timing information component 725 may receive timing information for the data flow via one or more system messages associated with the data flow.

The transmitter 730 may transmit signals generated by other components of the device 705. In some examples, the transmitter 730 may be collocated with a receiver 710 in a transceiver module. For example, the transmitter 730 may be an example of aspects of the transceiver 920 described with reference to FIG. 9. The transmitter 730 may utilize a single antenna or a set of antennas.

Figure 8:
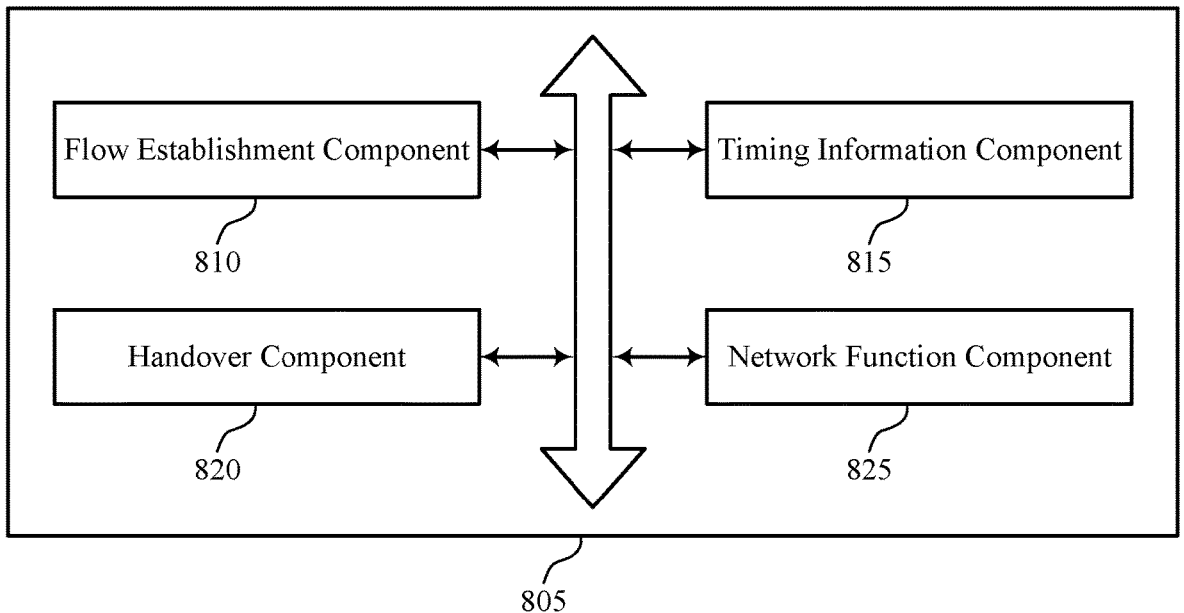
FIG. 8 shows a block diagram of a communications manager that supports signaling timing information for a time sensitive network in a wireless communications system in accordance with aspects of the present disclosure.

FIG. 8 shows a block diagram 800 of a communications manager 805 that supports signaling timing information for a time sensitive network in a wireless communications system in accordance with one or more aspects of the present disclosure. The communications manager 805 may be an example of aspects of a communications manager 615, a communications manager 715, or a communications manager 910 described herein. The communications manager 805 may include a flow establishment component 810, a timing information component 815, a handover component 820, and a network function component 825. Each of these modules may communicate, directly or indirectly, with one another (e.g., via one or more buses).

The flow establishment component 810 may receive a request for establishing a data flow with a UE, where the UE provides communication with one or more TSN endpoints via the first node of the RAN. In some examples, the flow establishment component 810 may establish the data flow based on timing information associated with the data flow. In some cases, the first node of the RAN is a base station or a UPF associated with the RAN. In some cases, the timing information is included with configuration information for the data flow, and where the configuration information is included in one or more of a QoS profile associated with the data flow, one or more QoS rules associated with the data flow, or one or more PDRs associated with the data flow.

The timing information component 815 may receive timing information for the data flow via one or more system messages associated with the data flow. In some cases, the timing information is provided by one or more of a TSN adaptation function, an AMF, a UPF, a SMF, a PCF, an AF, or any combinations thereof. In some cases, the one or more system messages include a first system message from the TSN adaptation function to the PCF, a second system message from the PCF to the SMF, a third system message from the SMF to the AMF, and a fourth system message from the AMF to the UE. In some cases, the one or more system messages include a first system message from the TSN adaptation function to the PCF, a second system message from the PCF to the AMF, and third system message from the AMF to the UE.

In some cases, the timing information includes a time offset indication associated with communicating with the TSN endpoints. In some cases, the timing information further includes a traffic periodicity, one or more packet size parameters, or combinations thereof, associated with the data flow. In some cases, the timing information further includes one or more of an uplink time offset, a downlink time offset, or a time offset associated with a first TSN endpoint of the TSN endpoints. In some cases, the time offset indication includes one or more of a time offset start indication, a time offset end indication, a time offset duration indication, or a packet delivery deadline indication. In some cases, the time offset indication is determined with respect to a TSN time reference, and where the TSN time reference is one of one or more TSN time references associated with the RAN.

The handover component 820 may receive a handover message from a second node in the RAN that the data flow is to be handed over from the second node to the first node.

The network function component 825 may interact with one or more network functions of the RAN or associated with the RAN to determine timing information associated with the data flow. In some cases, network function component 825 may interact, directly or indirectly, with a TSN adaptation function that may provide timing information. In some cases, timing information is provided via subscription information associated with the UE stored in one or more of a unified data repository (UDR), an authentication server function (AUSF), or a home subscriber server (HSS). In some cases, timing information may be preconfigured information provided by a network function or a RAN node.

Figure 9:
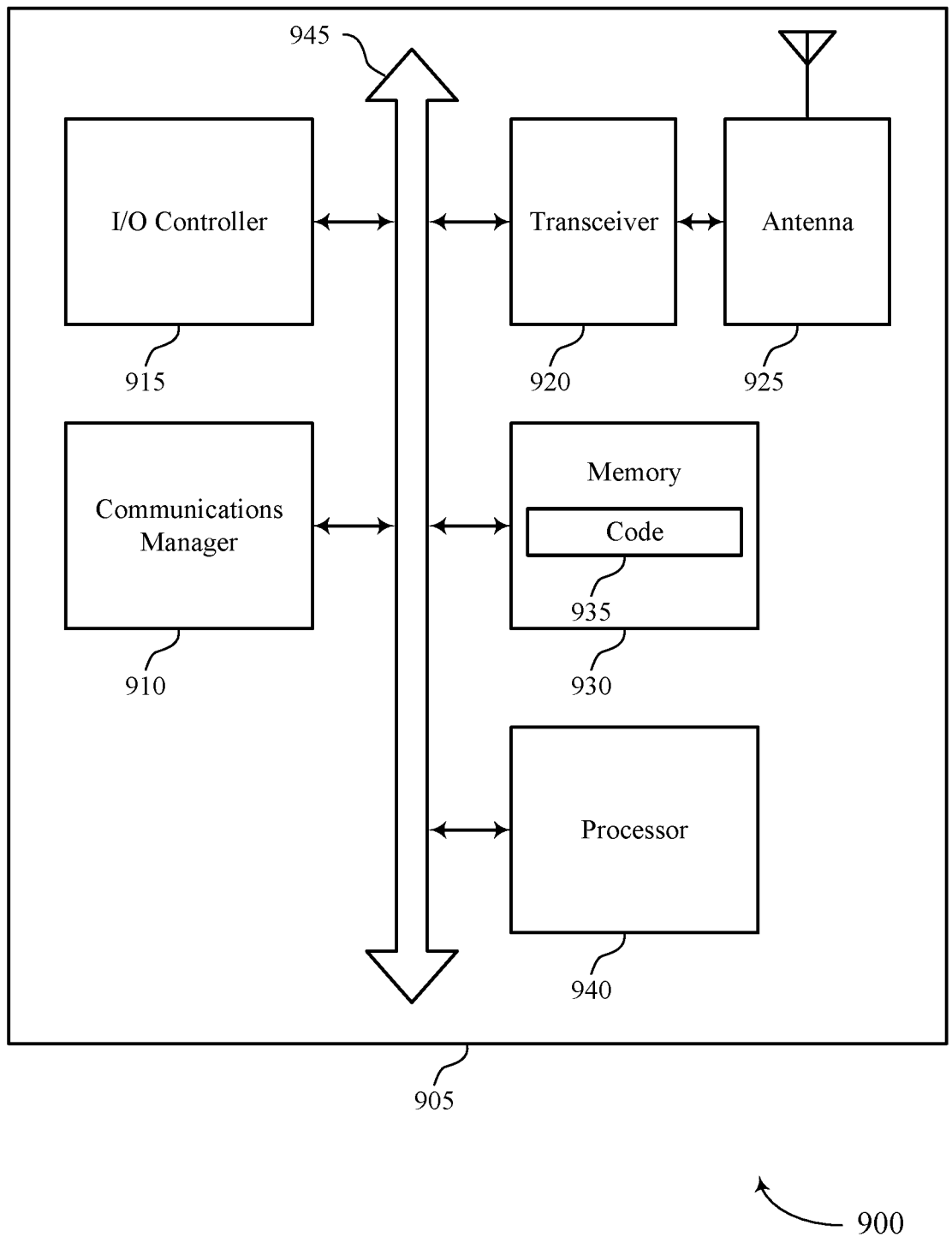
FIG. 9 shows a diagram of a system including a device that supports signaling timing information for a time sensitive network in a wireless communications system in accordance with aspects of the present disclosure.

FIG. 9 shows a diagram of a system 900 including a device 905 that supports signaling timing information for a time sensitive network in a wireless communications system in accordance with one or more aspects of the present disclosure. The device 905 may be an example of or include the components of device 605, device 705, or a network device as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive a request for establishing a data flow with a UE, where the UE provides communication with one or more TSN endpoints via the first node of the RAN, establish the data flow based on the timing information, and receive timing information for the data flow via one or more system messages associated with the data flow.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting signaling timing information for a time sensitive network in a wireless communications system).

Based on establishing a data flow, a processor of a device (e.g., controlling the receiver 610, the transmitter 620, or the transceiver 920) may reliably communicate with a UE or a group of UEs. Further, the processor of the device may identify subsequent transmission opportunities based on receiving the timing information. The processor of the device may turn on one or more processing units for identifying the subsequent transmission opportunities, increase a processing clock, or a similar mechanism within the device. As such, when the subsequent transmission opportunity is identified, the processor may be ready to respond more efficiently through the reduction of a ramp up in processing power.

The code 935 may include instructions to implement one or more aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
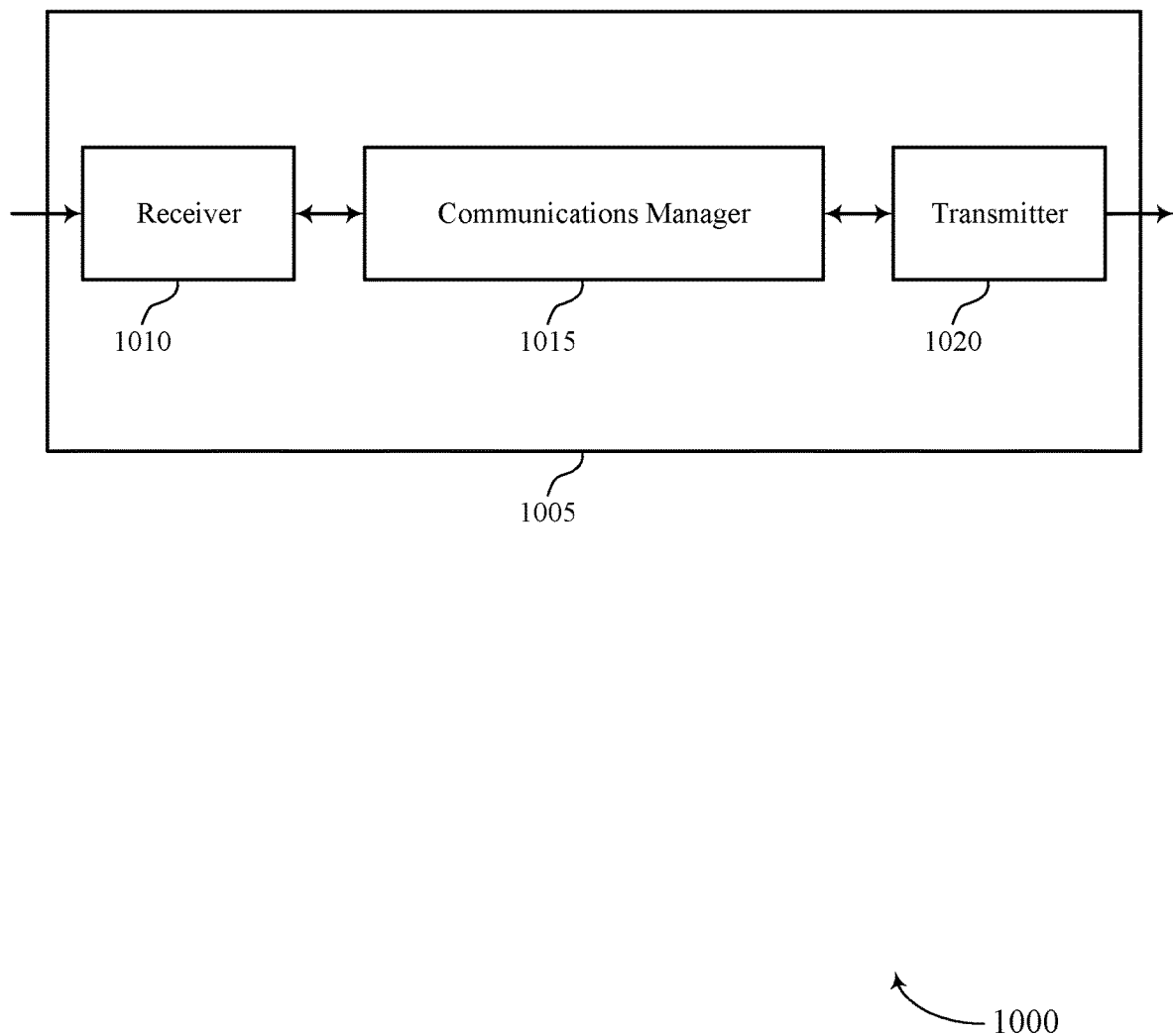
FIGS. 10 and 11 show block diagrams of devices that support signaling timing information for a time sensitive network in a wireless communications system in accordance with aspects of the present disclosure.

FIG. 10 shows a block diagram 1000 of a device 1005 that supports signaling timing information for a time sensitive network in a wireless communications system in accordance with one or more aspects of the present disclosure. The device 1005 may be an example of aspects of a network entity as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to signaling timing information for a time sensitive network in a wireless communications system, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may establish a data flow via a first node associated with a RAN, receive timing information for the data flow via one or more system messages associated with the data flow, the timing information associated with a TSN and at least one TSN adaptation function associated with the RAN, relay the timing information to one or more other nodes associated with the RAN, and communicate with one or more TSN endpoints, based on the timing information, to provide at least a portion of the data flow. The actions performed by the communications manager 1015 as described herein may be implemented to realize one or more potential advantages. One implementation may enable more efficient communications between the TSN endpoints. For example, by relaying the timing information to the nodes associated with the RAN, the RAN may efficiently configure SPS for one or more TSN flows. In such cases, the SPS may reduce latency in wireless communications, which may improve overall throughput in the RAN.

The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
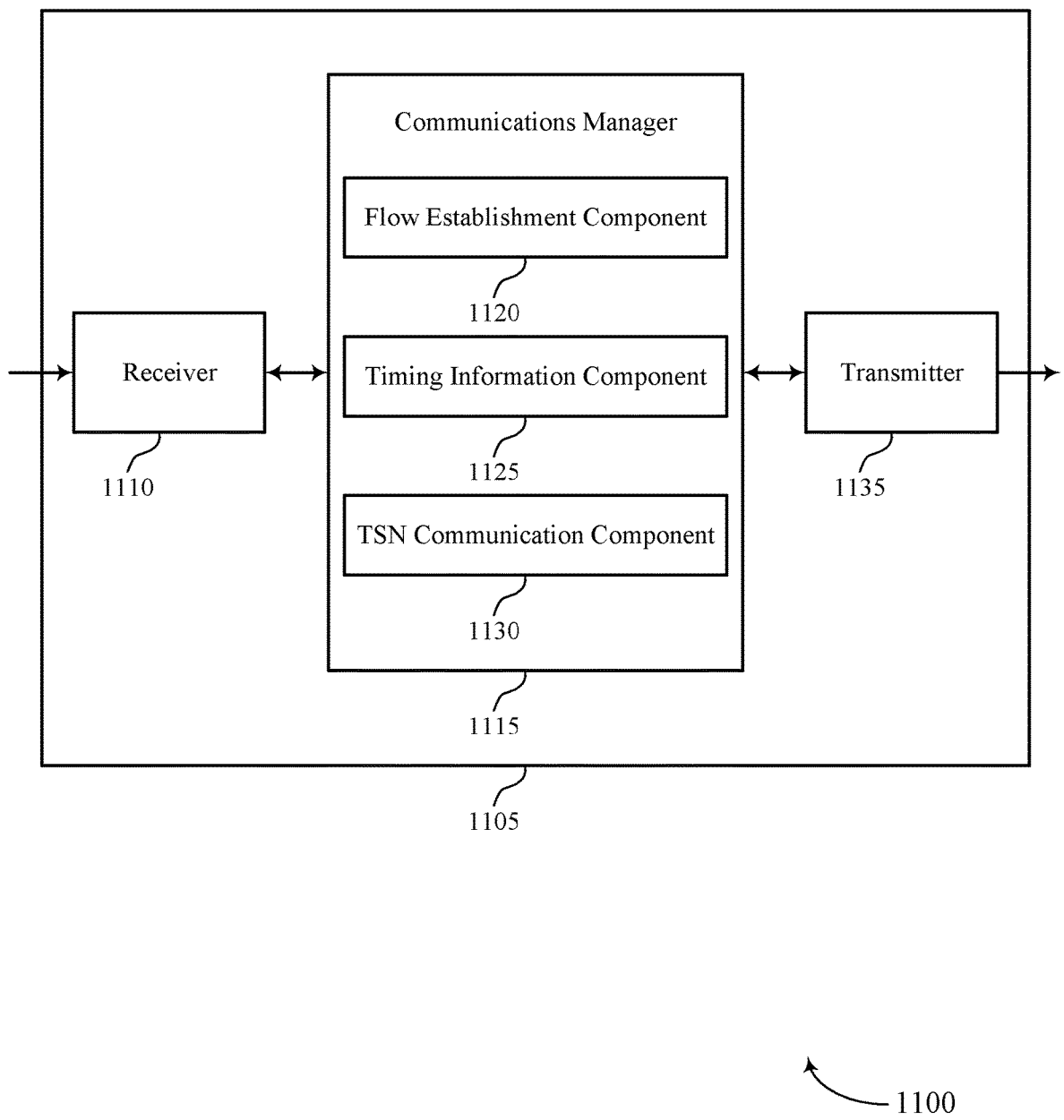

FIG. 11 shows a block diagram 1100 of a device 1105 that supports signaling timing information for a time sensitive network in a wireless communications system in accordance with one or more aspects of the present disclosure. The device 1105 may be an example of aspects of a device 1005 or a network entity 115 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to signaling timing information for a time sensitive network in a wireless communications system, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a flow establishment component 1120, a timing information component 1125, and a TSN communication component 1130. The communications manager 1115 may be an example of aspects of the communications manager 1310 described herein.

The flow establishment component 1120 may establish a data flow via a first node associated with a RAN.

The timing information component 1125 may receive timing information for the data flow via one or more system messages associated with the data flow, the timing information associated with a TSN and at least one TSN adaptation function associated with the RAN and relay the timing information to one or more other nodes associated with the RAN.

The TSN communication component 1130 may communicate with one or more TSN endpoints, based on the timing information, to provide at least a portion of the data flow.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1320 described with reference to FIG. 13. The transmitter 1120 may utilize a single antenna or a set of antennas.

Figure 12:
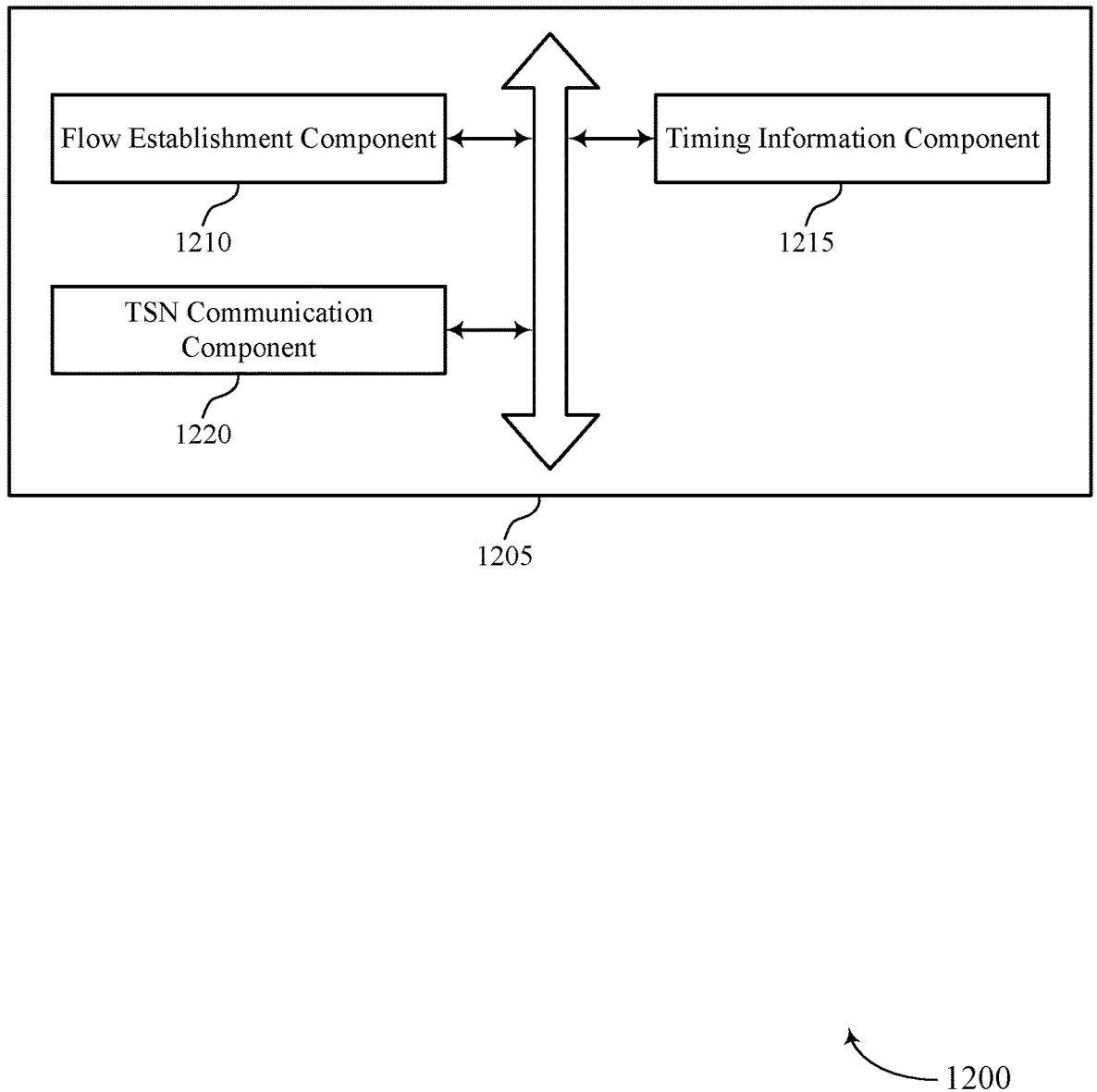
FIG. 12 shows a block diagram of a communications manager that supports signaling timing information for a time sensitive network in a wireless communications system in accordance with aspects of the present disclosure.

FIG. 12 shows a block diagram 1200 of a communications manager 1205 that supports signaling timing information for a time sensitive network in a wireless communications system in accordance with one or more aspects of the present disclosure. The communications manager 1205 may be an example of aspects of a communications manager 1015, a communications manager 1115, or a communications manager 1310 described herein. The communications manager 1205 may include a flow establishment component 1210, a timing information component 1215, and a TSN communication component 1220. Each of these modules may communicate, directly or indirectly, with one another (e.g., via one or more buses).

The flow establishment component 1210 may establish a data flow via a first node associated with a RAN. In some examples, the flow establishment component 1210 may receive a handover message from a second node in the RAN that the data flow is to be handed over from the second node to the first node. In some cases, the flow establishment component 1210 may be included in a network function associated with the RAN, and where the network function includes an AMF, a UPF, a SMF, a PCF, an application function, or any combinations thereof. In some cases, the first node of the RAN is a base station or a UPF associated with the RAN. In some cases, the timing information is included with configuration information for the data flow, and where the configuration information is included in one or more of a QoS profile associated with the data flow, one or more QoS rules associated with the data flow, or one or more packet detection rules (PDRs) associated with the data flow.

The timing information component 1215 may receive timing information for the data flow via one or more system messages associated with the data flow, the timing information associated with a TSN and at least one TSN adaptation function associated with the RAN. In some examples, the timing information component 1215 may relay the timing information to one or more other nodes associated with the RAN. In some examples, the timing information component 1215 may receive a system message from an AMF associated with the first node. In some examples, the timing information component 1215 may receive a system message from a different node in the RAN.

In some examples, the timing information may be provided by subscription information associated with the UE stored in one or more of a unified data repository (UDR), an authentication server function (AUSF), or a home subscriber server (HSS). In some examples, the timing information may be preconfigured information provided by a network function or a RAN node. In some cases, the timing information further includes a traffic periodicity, one or more packet size parameters, or combinations thereof, that are associated with the data flow. In some cases, the timing information further includes one or more of an uplink, a downlink time offset, or a time offset associated with a first TSN endpoint of the TSN endpoints. In some cases, the time offset indication includes one or more of a time offset start indication, a time offset end indication, a time offset duration indication, and a packet delivery deadline indication. In some cases, the time offset indication is determined with respect to a TSN time reference, and where the TSN time reference is one of one or more TSN time references associated with the RAN.

The TSN communication component 1220 may communicate with one or more TSN endpoints, based on the timing information, to provide at least a portion of the data flow.

Figure 13:
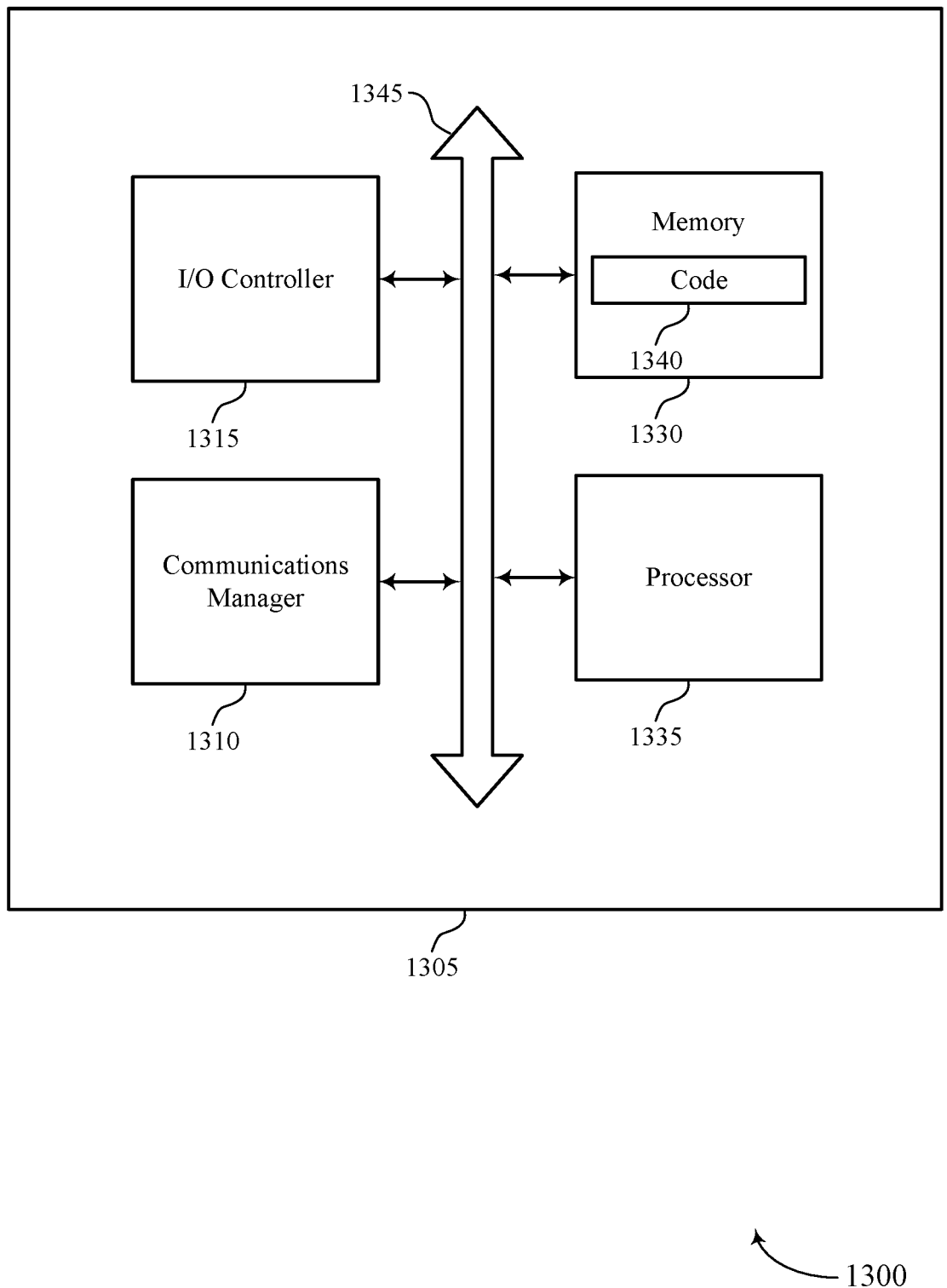
FIG. 13 shows a diagram of a system including a device that supports signaling timing information for a time sensitive network in a wireless communications system in accordance with aspects of the present disclosure.

FIG. 13 shows a diagram of a system 1300 including a device 1305 that supports signaling timing information for a time sensitive network in a wireless communications system in accordance with one or more aspects of the present disclosure. The device 1305 may be an example of or include the components of device 1005, device 1105, or a network entity as described herein. The device 1305 may include components for bi-directional voice and data communications including components for transmitting and receiving communications, including a communications manager 1310, an I/O controller 1315, memory 1330, and a processor 1335. These components may be in electronic communication via one or more buses (e.g., bus 1345).

The communications manager 1310 may establish a data flow via a first node associated with a RAN, receive timing information for the data flow via one or more system messages associated with the data flow, the timing information associated with a TSN and at least one TSN adaptation function associated with the RAN, relay the timing information to one or more other nodes associated with the RAN, and communicate with one or more TSN endpoints, based on the timing information, to provide at least a portion of the data flow.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The memory 1330 may include RAM and ROM. The memory 1330 may store computer-readable, computer-executable code 1340 including instructions that, when executed, cause the processor to perform various functions described herein. In some cases, the memory 1330 may contain, among other things, a BIOS which may control basic hardware or software operation such as the interaction with peripheral components or devices.

The processor 1335 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1335 may be configured to operate a memory array using a memory controller. In other cases, a memory controller may be integrated into the processor 1335. The processor 1335 may be configured to execute computer-readable instructions stored in a memory (e.g., the memory 1330) to cause the device 1305 to perform various functions (e.g., functions or tasks supporting signaling timing information for a time sensitive network in a wireless communications system).

The code 1340 may include instructions to implement one or more aspects of the present disclosure, including instructions to support wireless communications. The code 1340 may be stored in a non-transitory computer-readable medium such as system memory or other type of memory. In some cases, the code 1340 may not be directly executable by the processor 1335 but may cause a computer (e.g., when compiled and executed) to perform functions described herein.

Figure 14:
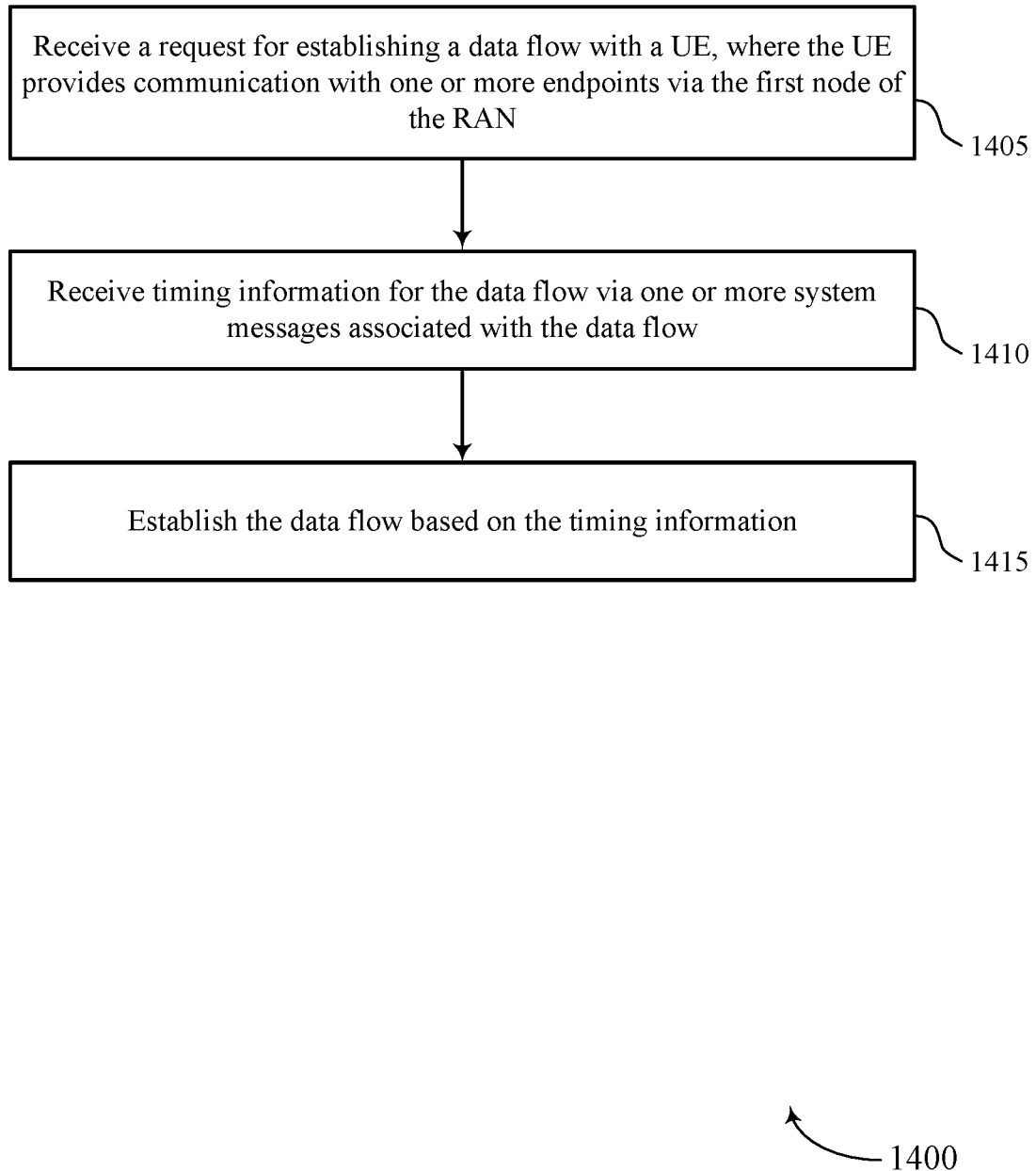
FIGS. 14 and 15 show flowcharts illustrating methods that support signaling timing information for a time sensitive network in a wireless communications system in accordance with aspects of the present disclosure.

FIG. 14 shows a flowchart illustrating a method 1400 that supports signaling timing information for a time sensitive network in a wireless communications system in accordance with one or more aspects of the present disclosure. The operations of method 1400 may be implemented by a device or its components as described herein. For example, the operations of method 1400 may be performed by a communications manager as described with reference to FIGS. 6 through 9. In some examples, a device may execute a set of instructions to control the functional elements of the device to perform the functions described herein. Additionally or alternatively, a device may perform aspects of the functions described herein using special-purpose hardware.

At 1405, the device may receive a request for establishing a data flow with a UE, where the UE provides communication with one or more TSN endpoints via the first node of the RAN. The operations of 1405 may be performed according to the methods described herein. In some examples, aspects of the operations of 1405 may be performed by a flow establishment component as described with reference to FIGS. 6 through 9. In some cases, the device may be a first node of the RAN, a base station, or a user plane function (UPF) associated with the RAN.

At 1410, the device may receive timing information for the data flow via one or more system messages associated with the data flow. The operations of 1410 may be performed according to the methods described herein. In some examples, aspects of the operations of 1410 may be performed by a timing information component as described with reference to FIGS. 6 through 9. In some cases, the timing information is provided by one or more of a TSN adaptation function, an AMF, a UPF, a SMF, a PCF, an application function, or any combinations thereof. In some cases, the one or more system messages include a first system message from the TSN adaptation function to the PCF, a second system message from the PCF to the SMF, a third system message from the SMF to the AMF, and a fourth system message from the AMF to the UE. In some cases, the one or more system messages include a first system message from the TSN adaptation function to the PCF, a second system message from the PCF to the AMF, and third system message from the AMF to the UE.

In some cases, the timing information includes a time offset indication associated with communicating with the TSN endpoints. In some cases, the timing information further includes a traffic periodicity, one or more packet size parameters, or combinations thereof, associated with the data flow. In some cases, the timing information further includes one or more of an uplink time offset, a downlink time offset, or a time offset associated with a first TSN endpoint of the TSN endpoints. In some cases, the time offset indication includes one or more of a time offset start indication, a time offset end indication, a time offset duration indication, or a packet delivery deadline indication. In some cases, the time offset indication is determined with respect to a TSN time reference, and where the TSN time reference is one of one or more TSN time references associated with the RAN. In some cases, the timing information is included with configuration information for the data flow, and where the configuration information is included in one or more of a quality of service (QoS) profile associated with the data flow, one or more QoS rules associated with the data flow, or one or more packet detection rules (PDRs) associated with the data flow.

At 1415, the device may establish the data flow based on the timing information. The operations of 1415 may be performed according to the methods described herein. In some examples, aspects of the operations of 1415 may be performed by a flow establishment component as described with reference to FIGS. 6 through 9. In some cases, the device may receive a handover message from a second node in the RAN that the data flow is to be handed over from the second node to the first node, and perform handover operations based on the handover message.

Figure 15:
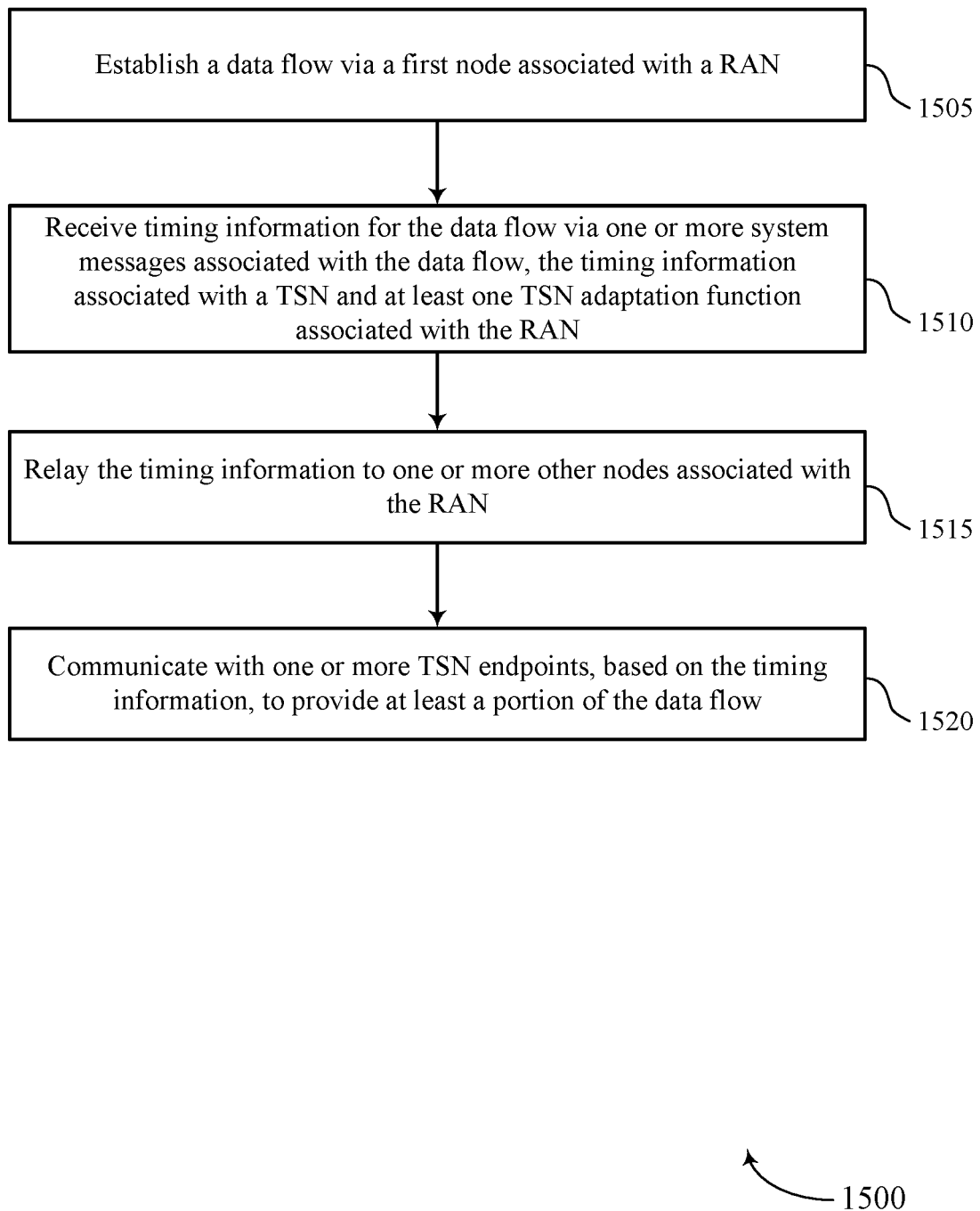

FIG. 15 shows a flowchart illustrating a method 1500 that supports signaling timing information for a time sensitive network in a wireless communications system in accordance with one or more aspects of the present disclosure. The operations of method 1500 may be implemented by a network entity or its components as described herein. For example, the operations of method 1500 may be performed by a communications manager as described with reference to FIGS. 10 through 13. In some examples, a network entity may execute a set of instructions to control the functional elements of the network entity to perform the functions described herein. Additionally or alternatively, a network entity may perform aspects of the functions described herein using special-purpose hardware.

At 1505, the network entity may establish a data flow via a first node associated with a RAN. The operations of 1505 may be performed according to the methods described herein. In some examples, aspects of the operations of 1505 may be performed by a flow establishment component as described with reference to FIGS. 10 through 13. In some cases, the method is performed by a network function associated with the RAN, and where the network function includes an AMF, a UPF, a SMF, a PCF, an application function, or any combinations thereof. In some cases, the network entity may receive a handover message from a second node in the RAN that the data flow is to be handed over from the second node to the first node. In some cases, the network entity is associated with the first node of the RAN, and the first node is a base station or a user plane function (UPF) associated with the RAN.

At 1510, the network entity may receive timing information for the data flow via one or more system messages associated with the data flow, the timing information associated with a TSN and at least one TSN adaptation function associated with the RAN. The operations of 1510 may be performed according to the methods described herein. In some examples, aspects of the operations of 1510 may be performed by a timing information component as described with reference to FIGS. 10 through 13. In some cases, the network entity may receive a system message from an AMF associated with the first node, or may receive a system message from a different node in the RAN.

In some cases, the timing information includes a time offset indication associated with communicating with the TSN endpoints. In some cases, the timing information further includes a traffic periodicity, one or more packet size parameters, or combinations thereof, that are associated with the data flow. In some cases, the timing information further includes one or more of an uplink, a downlink time offset, or a time offset associated with a first TSN endpoint of the TSN endpoints. In some cases, the time offset indication includes one or more of a time offset start indication, a time offset end indication, a time offset duration indication, and a packet delivery deadline indication. In some cases, the time offset indication is determined with respect to a TSN time reference, and where the TSN time reference is one of one or more TSN time references associated with the RAN. In some cases, the timing information is included with configuration information for the data flow, and where the configuration information is included in one or more of a QoS profile associated with the data flow, one or more QoS rules associated with the data flow, or one or more PDRs associated with the data flow.

At 1515, the network entity may relay the timing information to one or more other nodes associated with the RAN. The operations of 1515 may be performed according to the methods described herein. In some examples, aspects of the operations of 1515 may be performed by a timing information component as described with reference to FIGS. 10 through 13.

At 1520, the network entity may communicate with one or more TSN endpoints, based on the timing information, to provide at least a portion of the data flow. The operations of 1520 may be performed according to the methods described herein. In some examples, aspects of the operations of 1520 may be performed by a TSN communication component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered network device 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the network devices 105 may have similar frame timing, and transmissions from different network devices 105 may be approximately aligned in time. For asynchronous operation, the network devices 105 may have different frame timing, and transmissions from different network devices 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first node of a radio access network (RAN), comprising:
   receiving a request for establishing a data flow with a user equipment (UE), wherein the UE provides communication with one or more time sensitive network (TSN) endpoints via the first node of the RAN;
   receiving timing information for the data flow via one or more system messages associated with the data flow, wherein the one or more system messages comprise at least a first system message from a policy control function (PCF) to an access and mobility management function (AMF), and wherein the first system message uses an interface that includes one or more rules that define the timing information; and
   establishing the data flow based at least in part on the timing information.

2. The method of claim 1, wherein the timing information is provided by one or more of a TSN adaptation function, the AMF, a user plane function (UPF), a session management function (SMF), the PCF, an application function, or any combinations thereof.

3. The method of claim 2, wherein the one or more system messages further comprise a second system message from the TSN adaptation function to the PCF, a third system message from the PCF to the SMF, a fourth system message from the SMF to the AMF, and a fifth system message from the AMF to the first node of the RAN.

4. The method of claim 2, wherein the one or more system messages further comprise a second system message from the TSN adaptation function to the PCF and a third system message from the AMF to the first node of the RAN.

5. The method of claim 1, wherein the establishing the data flow comprises:
   receiving a handover message from a second node in the RAN that the data flow is to be handed over from the second node to the first node.

6. The method of claim 1, wherein the first node of the RAN is a base station or a user plane function (UPF) associated with the RAN.

7. The method of claim 1, wherein the timing information is determined based at least in part on a timing configuration for the data flow provided by one or more of:
   a TSN adaptation function;
   subscription information associated with the UE stored in one or more of a unified data repository (UDR), an authentication server function (AUSF), or a home subscriber server (HSS); or
   preconfigured information provided by a network function or a RAN node.

8. The method of claim 1, wherein the timing information comprises a time offset indication associated with communicating with the TSN endpoints.

9. The method of claim 8, wherein the timing information further comprises a traffic periodicity, one or more packet size parameters, or combinations thereof, associated with the data flow.

10. The method of claim 8, wherein the timing information further includes one or more of an uplink time offset, a downlink time offset, or a time offset associated with a first TSN endpoint of the TSN endpoints.

11. The method of claim 8, wherein the time offset indication includes one or more of a time offset start indication, a time offset end indication, a time offset duration indication, or a packet delivery deadline indication.

12. The method of claim 8, wherein the time offset indication is determined with respect to a TSN time reference, and wherein the TSN time reference is one of a plurality of TSN time references associated with the RAN.

13. The method of claim 1, wherein the timing information is included with configuration information for the data flow, and wherein the configuration information is included in one or more of a quality of service (QoS) profile associated with the data flow, one or more QoS rules associated with the data flow, or one or more packet detection rules (PDRs) associated with the data flow.

14. The method of claim 1, further comprising:
determining an admission control for the UE based at least in part on the timing information.

15. The method of claim 1, further comprising:
determining a scheduling for the UE based at least in part on the timing information.

16. A method for wireless communication, comprising:
establishing a data flow via a first node associated with a radio access network (RAN) for a communication between one or more time sensitive network (TSN) endpoints;
receiving timing information for the data flow via one or more system messages associated with the data flow, wherein the one or more system messages comprise at least a first system message from a policy control function (PCF) to an access and mobility management function (AMF), the timing information associated with a TSN and at least one TSN adaptation function associated with the RAN, and wherein the first system message uses an interface that includes one or more rules that define the timing information; and
relaying the timing information to one or more other nodes associated with the RAN.

17. The method of claim 16, further comprising:
providing communications between one or more TSN endpoints, based at least in part on the timing information, to provide at least a portion of the data flow.

18. The method of claim 16, wherein the method is performed by a network function associated with the RAN, and wherein the network function comprises the AMF, a user plane function (UPF), a session management function (SMF), the PCF, an application function, or any combinations thereof.

19. The method of claim 16, wherein the receiving the timing information comprises one or more of:
receiving a system message from a network function associated with the first node; or
receiving a system message from a different node in the RAN.

20. The method of claim 16, wherein the establishing the data flow comprises one of:
receiving a handover message from a second node in the RAN that the data flow is to be handed over from the second node to the first node; or
receiving a handover message from a network function associated with the RAN that an aspect related to the data flow is to be handed over from the network function to a different network function.

21. The method of claim 16, wherein the first node of the RAN is a base station or a user plane function (UPF) associated with the RAN.

22. The method of claim 16, wherein the timing information is determined based at least in part on a timing configuration for the data flow provided by one or more of:
the TSN adaptation function;
subscription information associated with a user equipment (UE) stored in one or more of a unified data repository (UDR), an authentication server function (AUSF), or a home subscriber server (HSS); or
preconfigured information provided by a network function or a RAN node.

23. The method of claim 16, wherein the timing information comprises a time offset indication associated with communicating between the TSN endpoints.

24. The method of claim 23, wherein the timing information further comprises a traffic periodicity, one or more packet size parameters, or combinations thereof, that are associated with the data flow.

25. The method of claim 23, wherein the timing information further comprises one or more of an uplink, a downlink time offset, or a time offset associated with a first TSN endpoint of the TSN endpoints.

26. The method of claim 23, wherein the time offset indication includes one or more of a time offset start indication, a time offset end indication, a time offset duration indication, and a packet delivery deadline indication.

27. The method of claim 23, wherein the time offset indication is determined with respect to a TSN time reference, and wherein the TSN time reference is one of a plurality of TSN time references associated with the RAN.

28. The method of claim 16, wherein the timing information is included with configuration information for the data flow, and wherein the configuration information is included in one or more of a quality of service (QoS) profile associated with the data flow, one or more QoS rules associated with the data flow, or one or more packet detection rules (PDRs) associated with the data flow.

29. An apparatus for wireless communication, comprising: a processor; memory in electronic communication with the processor; and the processor and memory configured to:
receive a request for establishing a data flow with a user equipment (UE), wherein the UE provides communication with one or more time sensitive network (TSN) endpoints via a first node of a radio access network (RAN);
receive timing information for the data flow via one or more system messages associated with the data flow, wherein the one or more system messages comprise at least a first system message from a policy control function (PCF) to an access and mobility management function (AMF), and wherein the first system message uses an interface that includes one or more rules that define the timing information; and
establish the data flow based at least in part on the timing information.

30. The apparatus of claim 29, wherein the timing information is provided by one or more of a TSN adaptation function, the AMF, a user plane function (UPF), a session management function (SMF), the PCF, an application function, or any combinations thereof.

31. The apparatus of claim 29, wherein the timing information comprises a time offset indication associated with communicating with the TSN endpoints.

32. The apparatus of claim 29, wherein the timing information is included with configuration information for the data flow, and wherein the configuration information is included in one or more of a quality of service (QoS) profile associated with the data flow, one or more QoS rules associated with the data flow, or one or more packet detection rules (PDRs) associated with the data flow.

33. The apparatus of claim 29, wherein the processor and memory are configured to:
determine an admission control for the UE based at least in part on the timing information.

34. The apparatus of claim 29, wherein the processor and memory are configured to:
determine a scheduling for the UE based at least in part on the timing information.

35. An apparatus for wireless communication, comprising: a processor; memory in electronic communication with the processor; and the processor and memory configured to:
establish a data flow via a first node associated with a radio access network (RAN) for a communication between one or more time sensitive network (TSN) endpoints;
receive timing information for the data flow via one or more system messages associated with the data flow, wherein the one or more system messages comprise at least a first system message from a policy control function (PCF) to an access and mobility management function (AMF), the timing information associated with a TSN and at least one TSN adaptation function associated with the RAN, and wherein the first system message uses an interface that includes one or more rules that define the timing information; and
relay the timing information to one or more other nodes associated with the RAN.

36. The apparatus of claim 35, wherein the processor and memory are configured to:
provide communications between one or more TSN endpoints, based at least in part on the timing information, to provide at least a portion of the data flow.

37. The apparatus of claim 35, wherein the first node of the RAN is a base station or a user plane function (UPF) associated with the RAN.

38. The apparatus of claim 35, wherein the timing information comprises a time offset indication associated with communicating between the TSN endpoints.

39. The apparatus of claim 35, wherein the timing information is included with configuration information for the data flow, and wherein the configuration information is included in one or more of a quality of service (QoS) profile associated with the data flow, one or more QoS rules associated with the data flow, or one or more packet detection rules (PDRs) associated with the data flow.

40. An apparatus for wireless communication, comprising:
means for receiving a request for establishing a data flow with a user equipment (UE), wherein the UE provides communication with one or more time sensitive network (TSN) endpoints via a first node of a radio access network (RAN);
means for receiving timing information for the data flow via one or more system messages associated with the data flow, wherein the one or more system messages comprise at least a first system message from a policy control function (PCF) to an access and mobility management function (AMF), and wherein the first system message uses an interface that includes one or more rules that define the timing information; and
means for establishing the data flow based at least in part on the timing information.

41. An apparatus for wireless communication, comprising:
means for establishing a data flow via a first node associated with a radio access network (RAN) for a communication between one or more time sensitive network (TSN) endpoints;
means for receiving timing information for the data flow via one or more system messages associated with the data flow, wherein the one or more system messages comprise at least a first system message from a policy control function (PCF) to an access and mobility management function (AMF), the timing information associated with a TSN and at least one TSN adaptation function associated with the RAN, and wherein the first system message uses an interface that includes one or more rules that define the timing information; and
means for relaying the timing information to one or more other nodes associated with the RAN.

42. A non-transitory computer-readable medium storing code for wireless communication, the code comprising instructions executable by a processor to:
receive a request for establishing a data flow with a user equipment (UE), wherein the UE provides communication with one or more time sensitive network (TSN) endpoints via a first node of a radio access network (RAN);
receive timing information for the data flow via one or more system messages associated with the data flow, wherein the one or more system messages comprise at least a first system message from a policy control function (PCF) to an access and mobility management function (AMF), and wherein the first system message uses an interface that includes one or more rules that define the timing information; and
establish the data flow based at least in part on the timing information.

43. A non-transitory computer-readable medium storing code for wireless communication, the code comprising instructions executable by a processor to:
establish a data flow via a first node associated with a radio access network (RAN) for a communication between one or more time sensitive network (TSN) endpoints;
receive timing information for the data flow via one or more system messages associated with the data flow, wherein the one or more system messages comprise at least a first system message from a policy control function (PCF) to an access and mobility management function (AMF), the timing information associated with a TSN and at least one TSN adaptation function associated with the RAN, and wherein the first system message uses an interface that includes one or more rules that define the timing information; and
relay the timing information to one or more other nodes associated with the RAN.

* * * * *